United States Patent
Tanaka

(10) Patent No.: US 8,767,223 B2
(45) Date of Patent: Jul. 1, 2014

(54) CONTROLLING ALERT NOTIFICATION

(75) Inventor: Shun Tanaka, West New York, NJ (US)

(73) Assignee: Ricoh Company, Ltd., Tokyo (JP)

( * ) Notice: Subject to any disclaimer, the term of this patent is extended or adjusted under 35 U.S.C. 154(b) by 172 days.

(21) Appl. No.: 13/036,455

(22) Filed: Feb. 28, 2011

(65) Prior Publication Data

US 2012/0218578 A1 Aug. 30, 2012

(51) Int. Cl.
- G06F 3/12 (2006.01)
- G07B 17/00 (2006.01)
- G07F 19/00 (2006.01)

(52) U.S. Cl.
USPC ............................. 358/1.13; 358/1.15; 705/30

(58) Field of Classification Search
None
See application file for complete search history.

(56) References Cited

U.S. PATENT DOCUMENTS

| | | | |
|---|---|---|---|
| 2004/0073720 A1* | 4/2004 | Clough et al. | 710/15 |
| 2006/0064527 A1 | 3/2006 | Fisher et al. | |
| 2007/0279668 A1* | 12/2007 | Czyszczewski et al. | 358/1.14 |
| 2008/0278754 A1* | 11/2008 | Hibino | 358/1.15 |
| 2008/0307273 A1 | 12/2008 | Nguyen et al. | |
| 2010/0274689 A1* | 10/2010 | Hammad et al. | 705/30 |
| 2011/0173270 A1 | 7/2011 | Uchida et al. | |

FOREIGN PATENT DOCUMENTS

| | | | | |
|---|---|---|---|---|
| EP | 1785866 A1 | 5/2007 | | |
| EP | 1785866 A1 * | 5/2007 | | G06F 11/07 |

OTHER PUBLICATIONS

U.S. Appl. No. 12/722,367, filed Mar. 11, 2010 of Yuki Uchida et al.
U.S. Appl. No. 12/722,370, filed Mar. 11, 2010 of Yuki Uchida et al.
U.S. Appl. No. 12/722,374, filed Mar. 11, 2010 of Yuki Uchida et al.
U.S. Appl. No. 12/722,376, filed Mar. 11, 2010 of Yuki Uchida et al.
U.S. Appl. No. 12/722,381, filed Mar. 11, 2010 of Yuki Uchida et al.
U.S. Appl. No. 12/958,686, filed Dec. 2, 2010 of Shun Tanaka.
U.S. Appl. No. 13/014,384, filed Feb. 28, 2011 of Shun Tanaka.
U.S. Appl. No. 13/036,558, filed Feb. 28, 2011 of Shun Tanaka.
U.S. Appl. No. 13/036,644, filed Feb. 28, 2011 of Shun Tanaka.
U.S. Appl. No. 13/036,745, filed Feb. 28, 2011 of Shun Tanaka et al.
U.S. Appl. No. 13/086,608, filed Apr. 14, 2011 of Shun Tanaka et al.
U.S. Appl. No. 13/086,779, filed Apr. 14, 2011 of Shun Tanaka et al.
Apr. 26, 2012 European search report in connection with counterpart European patent application No. 12 15 7075.

* cited by examiner

Primary Examiner — Marivelisse Santiago Cordero
Assistant Examiner — Moustapha Diaby
(74) Attorney, Agent, or Firm — Cooper & Dunham LLP

(57) ABSTRACT

Apparatuses, systems and methods are provided for managing information technology devices, and controlling generation of alert notifications in connection therewith.

16 Claims, 23 Drawing Sheets

| IMPORTANCE LEVEL INFORMATION | |
|---|---|
| Alert Condition | Importance Level |
| Paper Jam | 3 |
| Out of Paper | 2 |
| Out of Ink | 3 |
| No Network Connection | 1 |
| Maximum Storage Capacity Reached | 1 |

Fig. 9

| DEFERMENT PERIOD INFORMATION ||
|---|---|
| Alert Condition | Notification Deferment Period |
| Paper Jam | 2 hours |
| Out of Paper | 1 hour |
| Out of Ink | 2 hours |
| No Network Connection | 10 minutes |
| Maximum Storage Capacity Reached | 10 minutes |

CONTROLLING ALERT NOTIFICATION

TECHNICAL FIELD

This disclosure relates to tools (systems, apparatuses, methodologies, computer program products, etc.) for managing information technology devices, and generation of alert notifications in connection therewith.

BACKGROUND

In the current information age, information technology (IT) tools are extensively used in enterprises and other organizations in order to facilitate processing of documents and data. IT administrators typically have the responsibilities of monitoring and managing IT assets (such as computers, printers, scanners, and other network-connected, or standalone devices). For example, a multi-function device (MFD), which can provide a large number of functions (such as scanning, printing, copying, email, web and/or file browsing, and so forth) is commonly found in the typical IT environment today.

IT management tools (such as application software) are available to IT administrators to assist the administrators with performing their duties. Such tools commonly include an alert notification feature wherein a notification is transmitted to an administrator to notify the administrator of any of various predetermined dangerous or potentially dangerous conditions within the IT environment the administrator oversees. For example, when a problem or alert condition occurs at a multi-function device, an alert notification may be generated and transmitted to the administrator to inform the administrator of the problem or condition.

There is a drawback, however, in that a large number of alert notifications may be transmitted to the IT administrator. This may be the case if, for example, a number of alert conditions occur within a short period of time. Further, alert notifications may be transmitted to the IT administrator as a result of minor problems at the multi-function device, even though such minor problems may be resolved in a short time and/or without the aid of the administrator (e.g., when a user clears a paper jam). As a result, the IT administrator may become overwhelmed with a large number of alert notifications, and the ability of the administrator to efficiently manage the IT environment is affected.

There exists a need for improvements to alert generation within an IT system.

SUMMARY

In an aspect of this disclosure, there is provided a tool (for example, an apparatus, application software, etc.) to an information technology (IT) administrator, to help with management of IT assets. Such tool (including, for example, a monitoring part) monitors such IT assets, such as one or more multi-function devices, and detects an occurrence of an alert condition at a multi-function device at a first time, and then determines (such as via a control part), based on a type of the detected alert condition, whether a notification deferment condition is present. In a case that the notification deferment condition is not present, the tool outputs a trigger signal to trigger a notification operation (e.g., causing a notification generation part to generate and transmit an alert notification through a network to one or more specified notification destinations). On the other hand, in a case that the notification deferment condition is present, the tool defers triggering the notification operation for a specific notification deferment period beginning at the first time when the alert condition is detected.

The notification deferment condition can be any one or more of various conditions. For example, deferment may be determined based on whether the alert condition is or is not a critical type, and in a case that the alert condition is a critical type, the tool (e.g., the control part thereof) causes the notification operation to be triggered. On the other hand, in a case that the alert condition is not a critical type, the notification operation may be deferred for the notification deferment period.

In another aspect, importance level information alert conditions may be registered along with alert conditions, indicating for each of the alert conditions, a corresponding importance level. When the alert condition is detected, the trigger signal is output only if the importance level corresponding to the detected alert condition is at or above a predetermined importance level threshold.

In another aspect, for each of a plurality of alert conditions, the alert condition is registered along with a corresponding notification deferment period. In a case that the notification deferment condition occurs, the notification operation is deferred for the notification deferment period corresponding to the detected alert condition.

In another aspect, a duration of the notification deferment period may depend on a type of the detected alert condition.

In another aspect, the notification operation may be performed only if it is determined that the alert condition has been maintained throughout the notification deferment period.

In another aspect, the notification operation is performed after the notification deferment period has expired, only if it is determined that the alert condition has occurred at least a first number of times during the notification deferment period.

In another aspect, the notification operation is triggered during the notification deferment period, if it is determined that the alert condition occurred at least a first number of times during the notification deferment period.

In another aspect, the control part triggers the notification operation, if the control part determines that the next occurrence of the alert condition is after the expiration of the notification deferment period.

BRIEF DESCRIPTION OF THE DRAWINGS

The aforementioned and other aspects, features and advantages can be more readily understood from the following detailed description with reference to the accompanying drawings wherein:

FIGS. 6A and 6B illustrate examples of user interface screens of a management apparatus, such as management apparatus 17 depicted in FIG. 1A;

FIG. 7 shows an example of a table registering importance levels for each of various alert conditions;

FIG. 9 shows an example of a table registering notification deferment periods for each of various alert conditions;

DETAILED DESCRIPTION

Figure 1A:
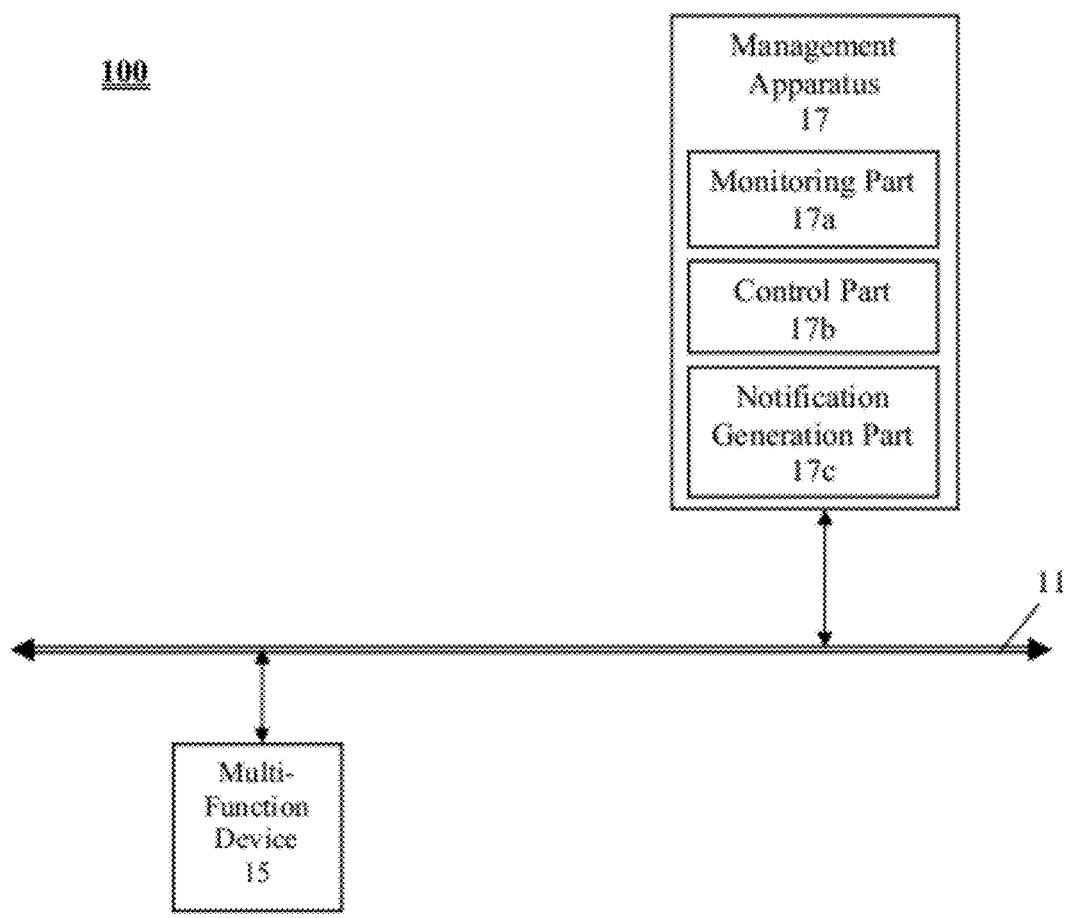
FIG. 1A shows a block diagram of a system, according to an exemplary embodiment of this disclosure.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, there is described tools (systems, apparatuses, methodologies, computer program products, etc.) for managing information technology devices, such as computers, printers, scanners, multi-function devices, and other network-connected, or standalone devices.

For example, FIG. 1A shows schematically a system 100 for managing a multi-function device (which can provide a large number of function, such as scanning, printing copying, email, web and/or file browsing, and so forth), according to an exemplary embodiment of this disclosure. System 100 includes a multi-function device 15 and a management apparatus 17, both interconnected by a network 11.

Management apparatus 17 of FIG. 1A includes a monitoring part 17a, a control part 17b, and a notification generation part 17c.

The monitoring part 17a of the management apparatus 17 is configured to monitor the multi-function device 15 through the network 11, and detect an occurrence of an alert condition at the multi-function device at a first time "t1". As described in this disclosure, an alert condition may indicate a current state, condition, and/or status of the multi-function device, or some other situation or scenario that exists or is currently in effect with respect to the multi-function device. For example, an alert condition may indicate that the device is experiencing a paper jam, the device is out of paper, the device is out of ink, the device is not connected to a network, a storage unit of the device has reached maximum capacity, and so forth. In this way, the alert condition may indicate a problem that requires attention or rectification.

The monitoring part 17a may detect the occurrence of an alert condition at the multi-function device 15 by repeatedly transmitting requests, to the multi-function device via the network 11, inquiring whether an alert condition exists or has occurred at the multi-function device. The multi-function device may transmit responses to the requests back to the management apparatus 17, wherein each response indicates whether an alert condition exists or has occurred at the multi-function device. Alternatively, the multi-function device 15 may automatically transmit regular status messages to the management apparatus 17 (without waiting for requests or queries from the management apparatus 17), wherein the status messages indicate the status of the multi-function device 15 and/or whether an alert condition has occurred at the multi-function device.

The control part 17b of the management apparatus 17 is configured to determine, based on a type of the detected alert condition, whether a notification deferment condition is present.

That is, after the monitoring part 17a detects the occurrence of the alert condition at the multi-function device 15 at the first time t1, the control part 17b analyzes the detected alert condition and determines a type of the alert condition. As a non-limiting example, the control part may determine that the alert condition is a 'critical' type alert condition (which indicates, for example, that the multi-function device is suffering a serious problem that requires immediate attention), or the control part may determine that the alert condition is a not a critical type alert condition (which indicates, for example, that the multi-function device is suffering a minor problem that does not require immediate attention).

Based on the type of the alert condition, the control part 17b determines whether a notification deferment condition is present. The notification deferment condition may be defined as any condition or criteria used to decide whether to trigger a notification operation or differ triggering a notification operation, as described in greater detail below. As a non-limiting example, the notification deferment condition may be that the detected alert condition is not a 'critical' type alert condition. In this case, if the detected alert condition is not a critical type, the control part determines that the notification deferment condition is present, whereas if the detected alert condition is a critical type, the control part determines that the notification deferment condition is not present.

In a case that the control part 17b determines that the notification deferment condition is not present, the control part is configured to output a trigger signal to trigger a notification operation. On the other hand, in a case that the control part 17b determines that the notification deferment condition is present, the control part defers triggering the notification operation, for a specific notification deferment period beginning at (or shortly after) the first time t1 when the alert condition is detected by the monitoring part 17a. The notification deferment period may be any specific time period.

Figure 6A:
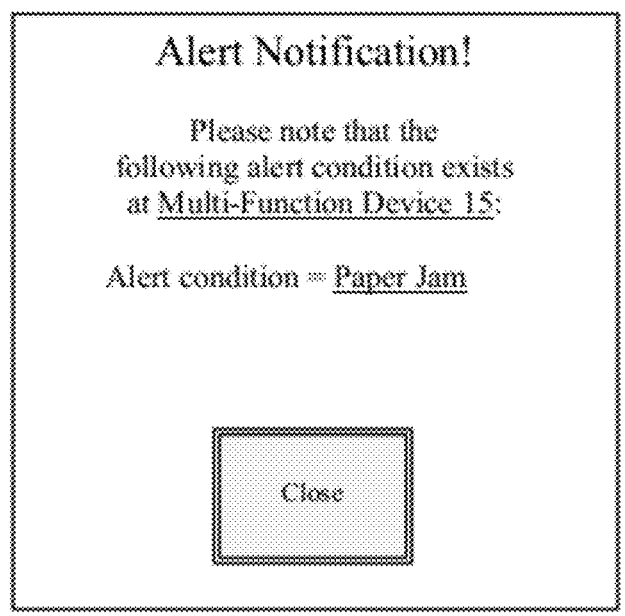

As described herein, the notification operation of this disclosure is an operation that includes generating an alert notification and transmitting the generated alert notification through the network. The alert notification may be a message transmitted via one of a plurality of protocols (e.g. email, text, facsimile, pager, SMS, Twitter, Facebook, etc.) that describes the nature of the detected alert condition. For example, the alert notification may indicate that the device is experiencing a paper jam, the device is out of paper, the device is out of ink, the device is not connected to a network, a storage unit of the device has reached maximum capacity, and so forth. The generated alert notification may be transmitted through the network to an address corresponding to an IT administrator of the network. FIG. 6A depicts an example of an alert notification as it is presented to an administrator on a user interface of a device, such as a client terminal or management apparatus 17. The alert notification depicted in FIG. 6A indicates that the alert condition 'Paper Jam' exists at the multi-function device 15.

If the control part 17b determines, based on the type of the detected alert condition, that the notification deferment condition is not present, the control part 17b may output a trigger signal to the notification generation part 17c, to thereby cause the notification operation to be performed. On the other hand, if the control part determines, based on the type of the detected alert condition, that the notification deferment condition is present, then the control may defer triggering the notification operation for the notification deferment period, by preventing the output of the trigger signal to the notification generation part 17c for the duration of the notification deferment period.

The notification generation part 17c of the management apparatus 17 is configured to perform the notification operation, based on whether the trigger signal is outputted by the control part 17b. That is, the notification generation part is configured to perform the notification operation, when the notification generation part receives the trigger signal from the control part. As described earlier, the notification operation of this disclosure is an operation that includes generating an alert notification and transmitting the generated alert notification through the network. Thus, the notification generation part is configured to generate the appropriate alert notification, based on the detected alert condition, and transmit the generated alert condition through the network. For example, the notification generation part 17c may include (or be connected to) a communication unit, such as a network card, network adapter or Network Interface Card (NIC), which may be used to transmit the generated alert notification through the network.

Thus, according to this exemplary embodiment of this disclosure, after a management apparatus detects an occurrence of an alert condition at a multi-function device at a first time, the management apparatus does not necessarily notify an IT administrator immediately of the alert condition. Instead, the management apparatus either (a) triggers a notification operation or (b) defers triggering the notification operation for a specific notification deferment period, based on a type of the detected alert condition.

Accordingly, the administrator is only notified of certain alert conditions, if it is deemed necessary based on the nature and/or severity of the alert condition. For other types of alert conditions, the management apparatus may ignore the occurrence of the alert condition for a certain period of time, allowing for the alert condition to be corrected at the multi-function device. For instance, if a simple error occurs, the management apparatus will not report the error to the administrator for a several minutes, for example. During those minutes, the management apparatus may wait for the multi-function device to recover from the condition (e.g. the user clears a paper jam, the user provides more paper to the device). In this way, an IT administrator is not overwhelmed with a large number of alert notifications.

Figure 1B:
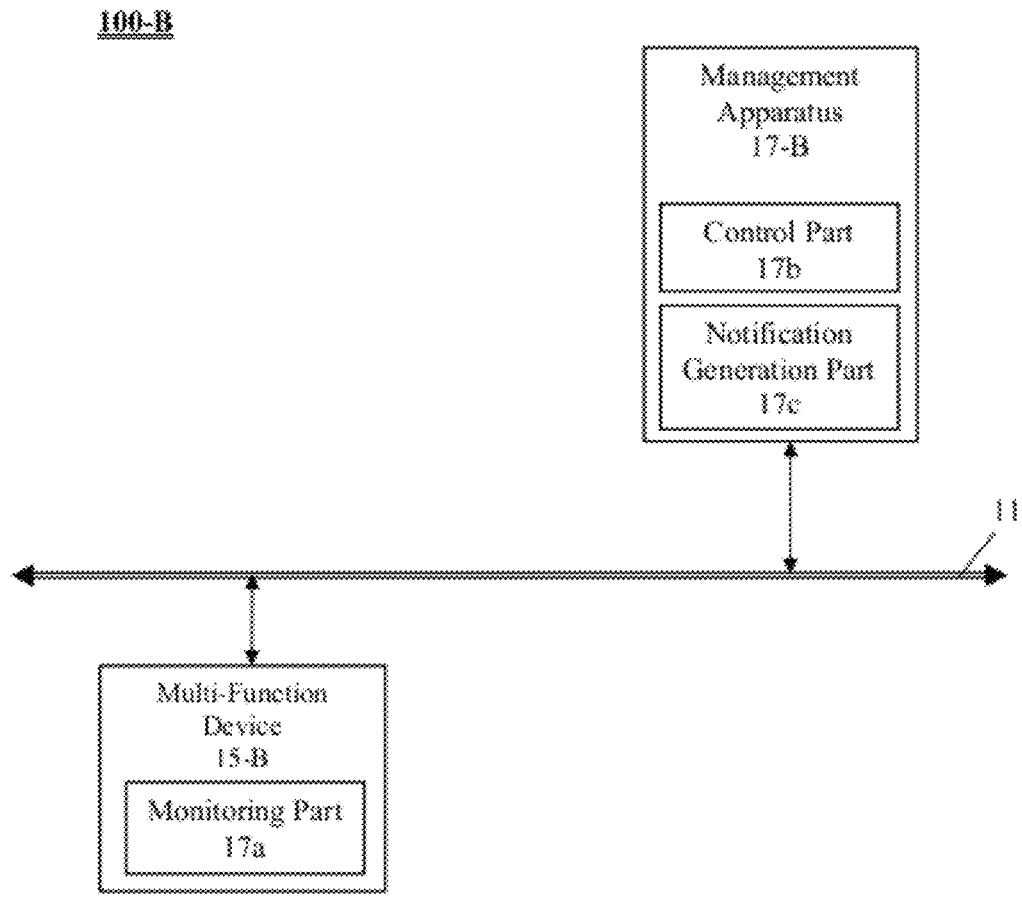
FIG. 1B shows a block diagram of a system, according to another exemplary embodiment of this disclosure.

In the exemplary embodiment illustrated in FIG. 1A, the management apparatus is depicted as directly including or physically incorporating the monitoring part 17a. However, according to another exemplary embodiment of this disclosure, the monitoring part 17a of the multi-function device may instead be included in or attached to the multi-function device 15. For example, FIG. 1B illustrates an example of a system 100-B including a management apparatus 17-B similar to management apparatus 17, except that the monitoring part 17a of management apparatus 17-B is included/incorporated into the multi-function device 15-B. The monitoring part 17a of multi-function device 17-B may detect an occurrence of an alert condition at the multi-function device 15-B, and then communicate with the control part 17b of the management apparatus 17-B, wherein the content of the communications may indicate the status of the multi-function device 15-B and/or whether an alert condition has occurred at the multi-function device.

The management apparatus of this disclosure may be realized by a computer program product including a computer-usable, non-transient medium (such as a disk storage apparatus) having instructions tangibly embodied therein that are executed by a computer. Thus, it should be understood that the management apparatus may be executed on a computer. While the management apparatus is shown as being external to the multi-function device, the management apparatus may in fact be executed on a client terminal and/or multi-function device.

The management apparatus may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

The network 11 can include one or more of a secure intranet or extranet local area network, a wide area network, any type of network that allows secure access, etc., or a combination thereof. Further, other secure communications links (such as a virtual private network, a wireless link, etc.) may be used as well in the network 11. In addition, the network 11 preferably uses TCP/IP (Transmission Control Protocol/Internet Protocol), but other protocols can also be used. How devices can connect to and communicate over the network 11 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 2:
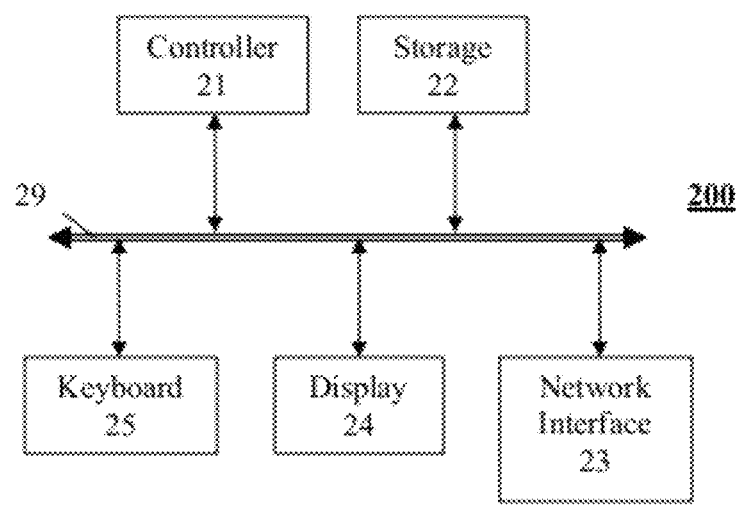
FIG. 2 shows a block diagram of an exemplary configuration of a computer that can be used to implement a management apparatus, such as management apparatus 17 of FIG. 1A.

FIG. 2 shows an exemplary constitution of a management apparatus 200 as a computer, for example, that can be configured through software to provide the management apparatus 17 of FIG. 1A. As shown in FIG. 2, the management apparatus 200 includes a controller (or central processing unit) 21 that communicates with a number of other components, including memory or storage part 22, network interface 23, display 24 and keyboard 25, by way of a system bus 29.

The management apparatus 200 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In management apparatus 200, the controller 21 executes program code instructions that controls device operations. The controller 21, memory/storage 22, network interface 23, display 24 and keyboard 25 are conventional, and therefore in order to avoid occluding the inventive aspects of this disclosure, such conventional aspects will not be discussed in detail herein.

The management apparatus 200 includes the network interface 23 for communications through a network, such as communications through the network 11 with the multi-function device 15 in FIG. 1A. However, it should be appreciated that the subject matter of this disclosure is not limited to such configuration. For example, the management apparatus 200 may communicate with client terminals through direct connections and/or through a network to which some components are not connected. As another example, the management apparatus 200 need not be provided by a server that services terminals, but rather may communicate with the devices on a peer basis, or in another fashion.

As mentioned above, management apparatus 17 is not limited to a server or computer, but can be manifested in any of various devices that can be configured to communicate over a network and/or the Internet.

The multi-function device 15 may be any apparatus (including a microprocessor chip or a collection of devices having varying degrees of integration) that has the ability to perform two or more functionalities. The multi-function device 15 may be a terminal or any computing device including but not limited to a personal, notebook or workstation computer, a kiosk, a PDA (personal digital assistant), a tablet computing device, a smartphone, a scanner, a printer, a facsimile machine, a server, a mobile phone or handset, another information terminal, etc. The multi-function device 15 is configured with software allowing the multi-function device to communicate through the network 11 with management apparatus 17.

Figure 3:
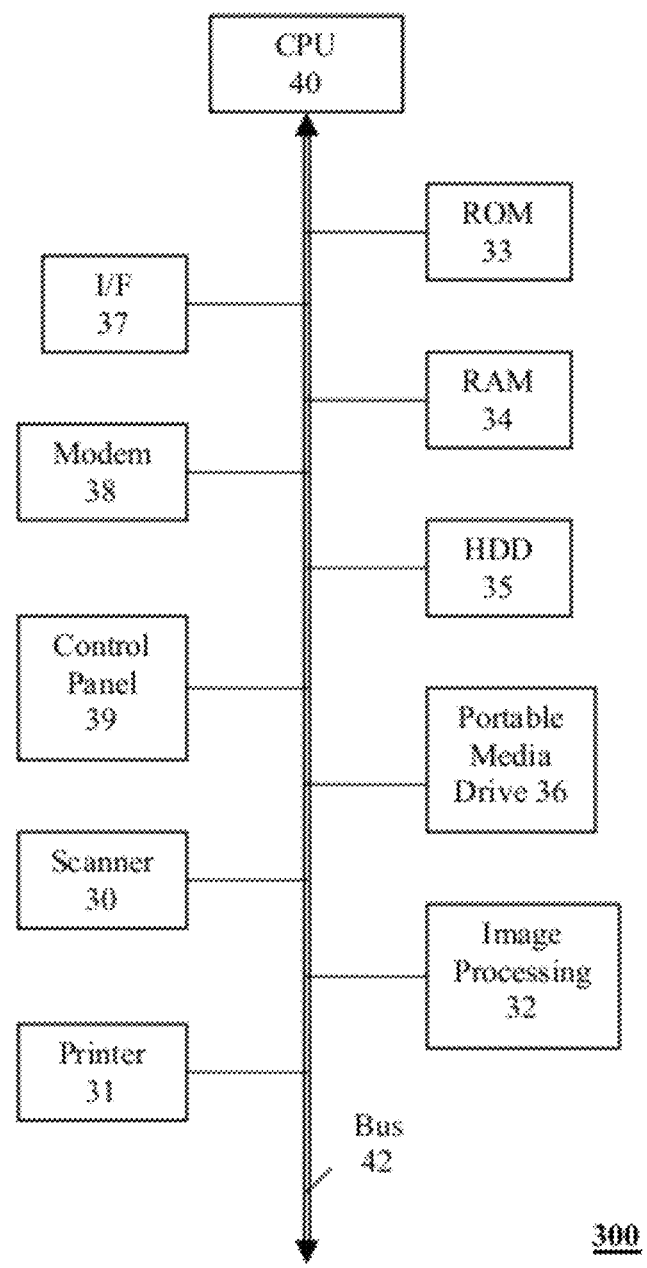
FIG. 3 shows a block diagram of an exemplary configuration of a multi-function device, such as multi-function device 15 of FIG. 1A.

An example of a configuration of a multi-function device 15 is shown schematically in FIG. 3. Device 300 includes a central processing unit (CPU) 40, and various elements connected to the CPU 40 by an internal bus 42. The CPU 40 services multiple tasks while monitoring the state of the device 300. The elements connected to the CPU 40 include a scanner unit 30, a printer unit 31, an image processing device 32, a read only memory (for example, ROM, PROM, EPROM, EEPROM, etc.) 33, a random access memory (RAM) 34, a hard disk drive (HDD) 35, portable media (for example, floppy disk, optical disc, magnetic discs, magneto-optical discs, semiconductor memory cards, etc.) drives 36, a communication interface (I/F) 37, a modem unit 38, and an operation panel 39.

Program code instructions for the device 300 can be stored on the read only memory 33, on the HDD 35, or on portable media and read by the portable media drive 36, transferred to the RAM 34 and executed by the CPU 40 to carry out the instructions. These instructions can include the instructions to the device to perform specified ones of its functions and permit the device 300 to interact with the management apparatus 17 and to control the operation panel 39 and the image processing unit 32 of the device 300.

The operation panel 39 includes a display screen that displays information allowing the user of the device 300 to operate the device 300. The display screen can be any of various conventional displays (such as a liquid crystal display, a plasma display device, a cathode ray tube display, etc.), but is preferably equipped with a touch sensitive display (for example, liquid crystal display), and configured to provide the GUI based on information input by an operator of the device, so as to allow the operator to conveniently take advantage of the services provided by the system. The display screen does not need to be integral with, or embedded in, the operation panel 39, but may simply be coupled to the operation panel by either a wire or a wireless connection. The operation panel 39 may include keys for inputting information or requesting various operations. Alternatively, the operation panel 39 and the display screen may be operated by a keyboard, a mouse, a remote control, touching the display screen, voice recognition, or eye-movement tracking, or a combination thereof. The device 300 is a multifunction device (with scanner, printer and image processing) and in addition can be utilized as a terminal to download documents from the network 11.

Additional aspects or components of the device 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 4A:
FIGS. 4A and 4B depict timing diagrams illustrating aspects of operations performed by a management apparatus, such as management apparatus 17 illustrated in FIG. 1A, according to an exemplary embodiment of this disclosure.
Figure 4B:
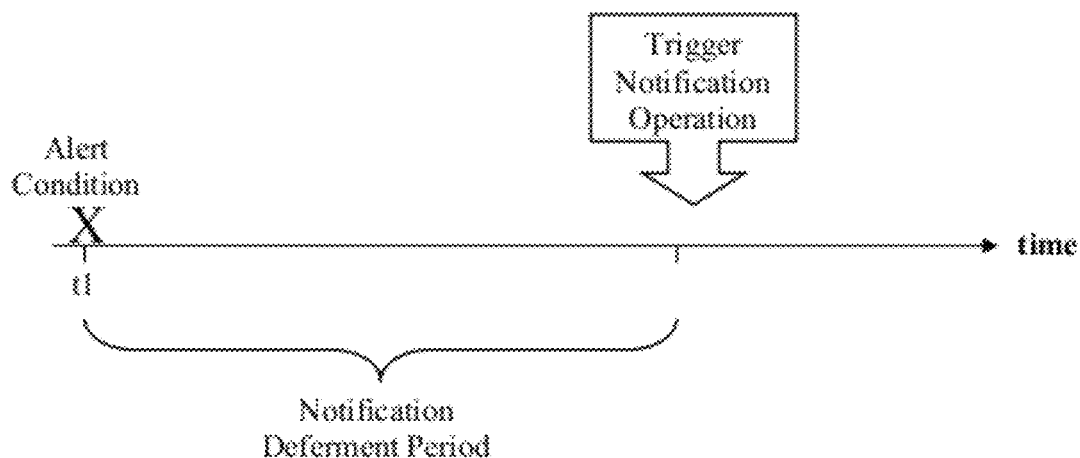

FIGS. 4A and 4B depict timing diagrams illustrating certain aforementioned aspects of operations performed by a management apparatus, such as management apparatus 17 illustrated in FIG. 1A, according to this exemplary embodiment of this disclosure.

As seen in FIG. 4A, the alert condition "X" is detected at the multi-function device at the first time "t1". If the control part 17b of the management apparatus 17 determines that the notification deferment condition is not present, then the control part will trigger the notification operation shortly after the first time t1. On the other hand, with reference to FIG. 4B, if the control part 17 determines that the notification deferment condition is present, then the control part will defer triggering the notification operation for a notification deferment period. Once the notification deferment period has expired, the control part may trigger the notification operation as necessary (e.g. if the alert condition is still present at the multi-function device).

Figure 5:
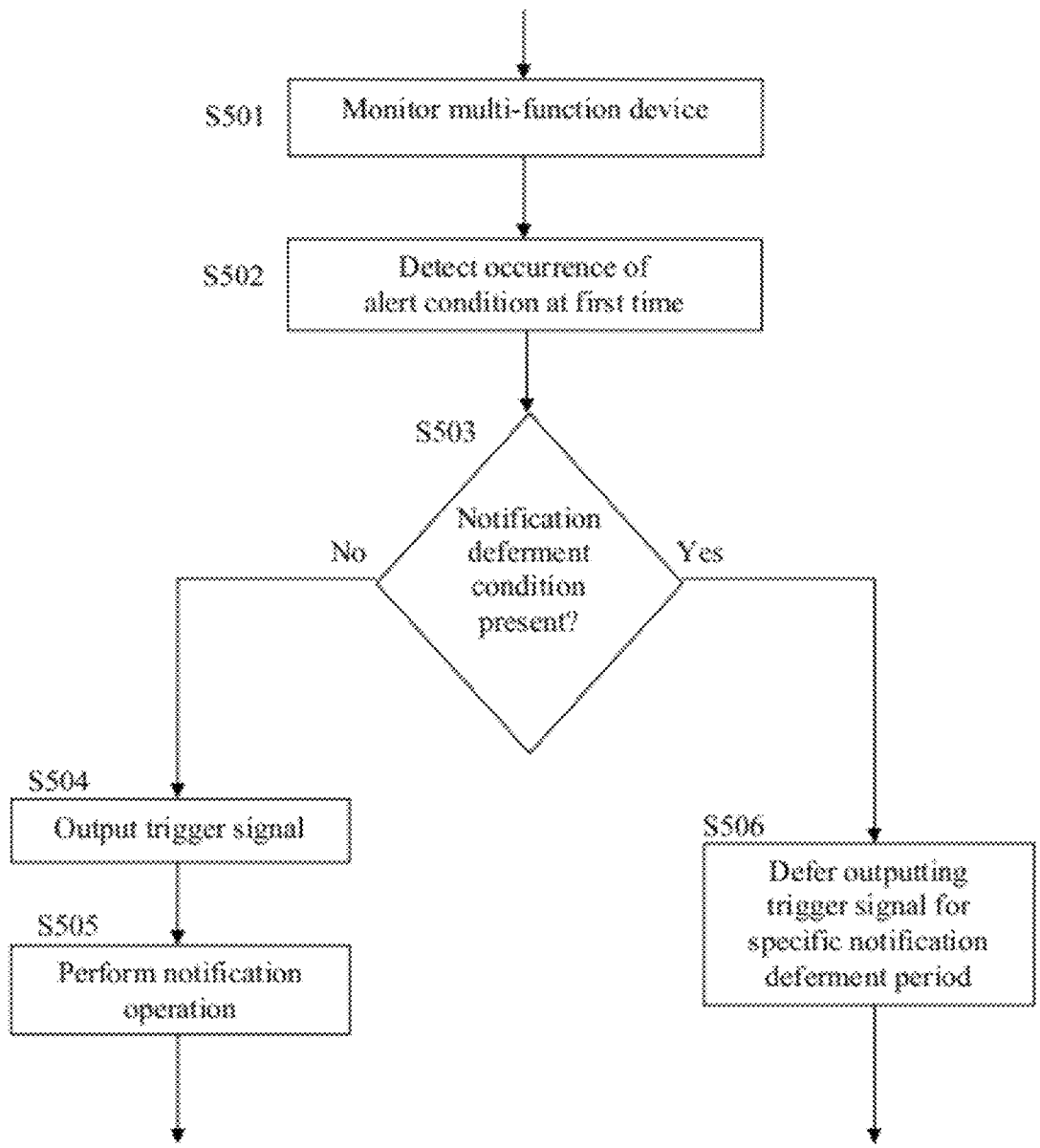
FIG. 5 shows a flowchart of a method performed by a management apparatus, such as management apparatus 17 illustrated in FIG. 1A, according to an exemplary embodiment of this disclosure.

Turning now to FIG. 5, there is shown a flowchart of a method performed by a management apparatus, such as management apparatus 17 illustrated in FIG. 1A, according to an exemplary embodiment of this disclosure.

In S501, the management apparatus monitors a multi-function device through the network. In S502, the management apparatus detects an occurrence of an alert condition at the multi-function device at a first time. In S503, the management apparatus determines, based on a type of the detected alert condition, whether a notification deferment condition is present. (As a non-limiting example, the notification deferment condition may be that the alert condition is not a critical type. Accordingly, in a case that the alert condition is not a critical type, the control part determines that the notification deferment condition is present, and in a case that the alert condition is a critical type, the control part determines that the notification condition is not present).

If it is determined in S503 that the notification deferment condition is not present (S503, No), then in S504 a trigger signal is outputted, and in S505 the notification operation is performed in response to the output of the trigger signal. On the other hand, if it is determined in S503 that the notification deferment condition is present (S503, Yes), then in S506 the management apparatus defers outputting the trigger signal for the duration of the specific notification deferment period.

According to another exemplary embodiment of this disclosure, the management apparatus 17 stores importance level information indicating a plurality of alert conditions and, for each of the alert conditions, a corresponding importance level. The importance level information may be maintained by, for example, the control part 17b and/or may be stored in a storage part of the management apparatus 17. For example, FIG. 2 shows an exemplary constitution of a management apparatus 200 as a computer, and the importance level information may be stored in storage part 22 of the management apparatus 200.

An example of importance level information is depicted in FIG. 7. The importance level information may list a plurality of alert conditions that may occur at the multi-function device 15. In the example of FIG. 7, the alert conditions include paper jam, out of paper, out of ink, no network connection, and maximum storage capacity reached. The importance level information also lists, for each of the alert conditions, a corresponding importance level. For example, it can be seen in the importance level information of FIG. 7 that the importance level corresponding to the alert condition 'Paper Jam' is 3, the importance level corresponding to the alert condition 'No Network Connection' is 1, and so forth.

Figure 6B:
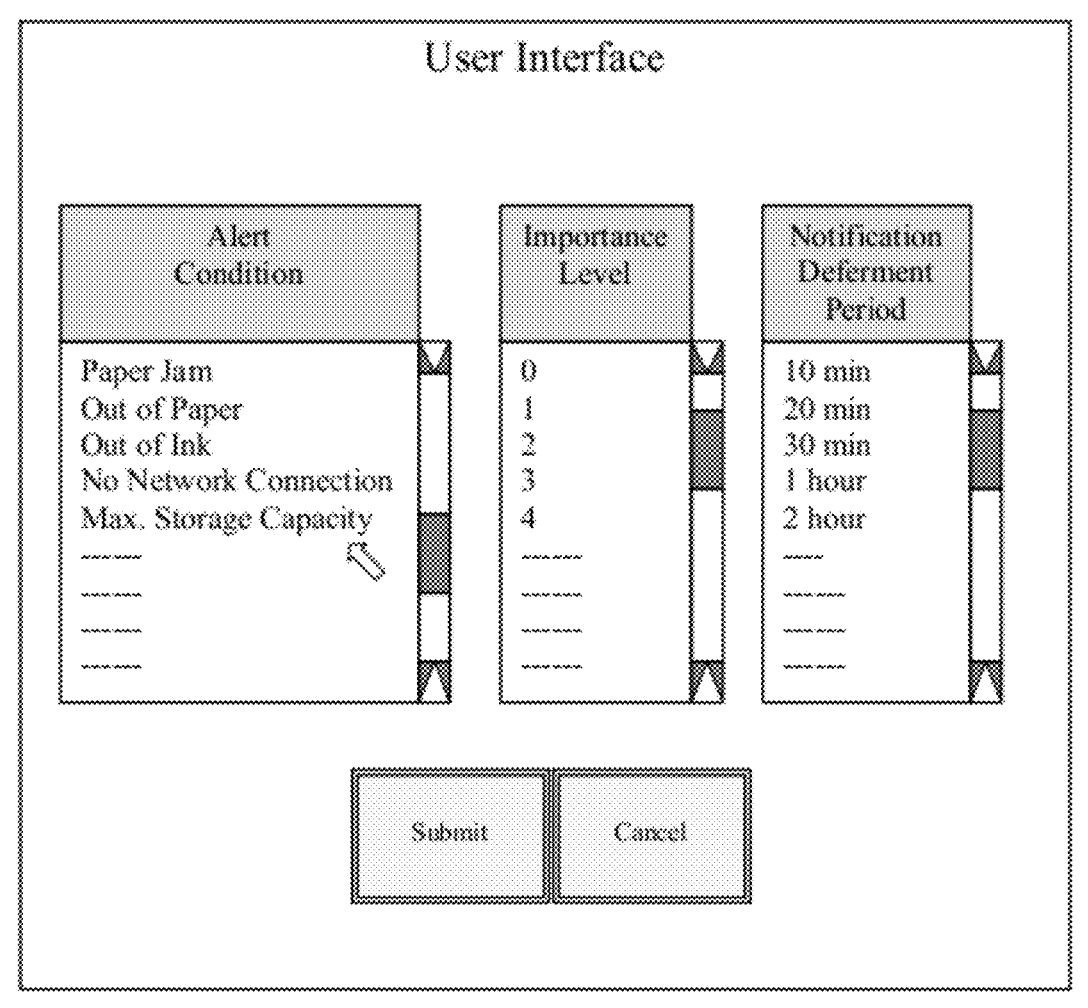

The information depicted in FIG. 7 is merely exemplary, and other alert conditions and/or importance levels may be included in the importance level information. Further, the management apparatus 17 may allow an administrator to change the importance level information as desired. For example, the management apparatus 17 may include a user interface configured to allow an administrator to change the importance levels corresponding to each alert condition, as illustrated in FIG. 6B.

According to this exemplary embodiment, the control part 17b only outputs the trigger signal, if the importance level corresponding to the detected alert condition is at or above a predetermined importance level threshold. Stated another way, the control part determines that the notification deferment condition is not present (and outputs the trigger signal) if the importance level corresponding to the detected alert condition is at or above a predetermined importance level threshold. On the other hand, the control part determines that the notification deferment condition is present (and defers triggering the notification operation) if the importance level corresponding to the detected alert condition is below a predetermined importance level threshold.

Using the example of the importance level information depicted in FIG. 7, suppose the predetermined importance level threshold is set to 2. (Note that the value of 2 as the predetermined importance level threshold is merely exemplary, and the threshold may be set to any value). If the initially detected alert condition is an 'Paper Jam' alert condition, it may be determined based on the importance level information that the importance level corresponding to the detected alert condition 'Paper Jam' is 3, which is at or above the predetermined importance level threshold set to 2. Thus, the control part 17b will determine that the notification deferment condition is not present, and trigger the notification operation by outputting the trigger signal.

On the other hand, if the initially detected alert condition is the 'No Network Connection' alert condition, it may be determined based on the importance level information that the importance level corresponding to the detected alert condition 'No Network Connection' is 1, which is below the predetermined importance level threshold set to 2. Thus, the control part 17b will determine that the notification deferment condition is present, and defer triggering the notification operation for a specific notification deferment period, as described above.

Thus, according to this exemplary embodiment, the management apparatus maintains importance level information indicating importance levels corresponding to a plurality of alert conditions. The management apparatus either (a) triggers a notification operation or (b) defers triggering the notification operation for a specific notification deferment period, based on whether the importance level corresponding to the detected alert condition is at or above a predetermined importance level threshold.

Accordingly, an IT administrator is only notified of certain alert conditions, if it is deemed necessary based on the importance level of the alert condition. For other types of alert conditions, the management apparatus may ignore the occurrence of the alert condition for a certain period of time, allowing for the alert condition to be corrected at the multi-function device. In this way, an administrator is not overwhelmed with a large number of alert notifications.

Figure 8:
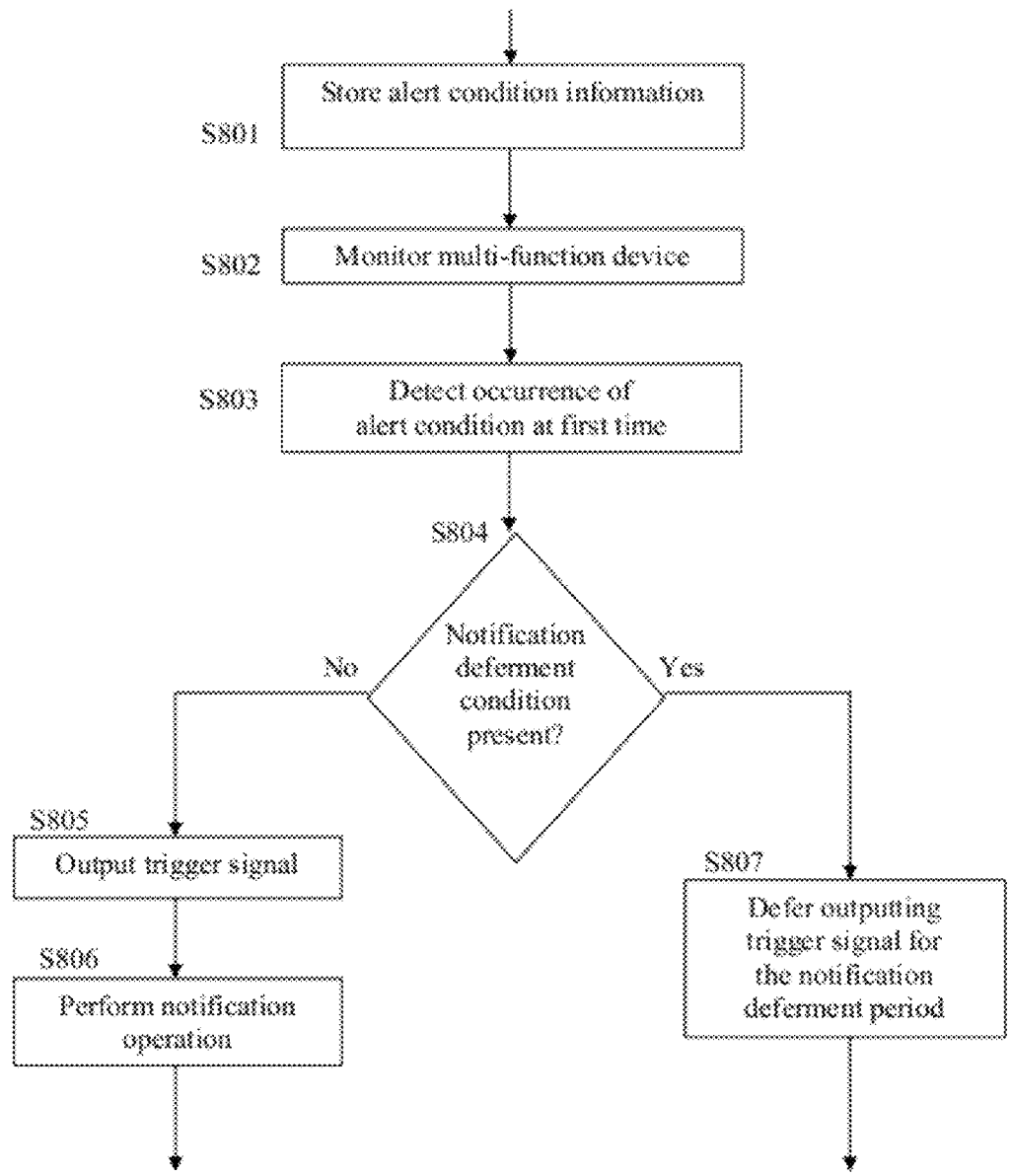
FIG. 8 shows a flowchart of a method performed by a management apparatus, such as management apparatus 17 illustrated in FIG. 1A, according to another exemplary embodiment of this disclosure.

Turning now to FIG. 8, there is shown a flowchart of a method performed by a management apparatus, such as management apparatus 17 illustrated in FIG. 1A, according to this exemplary embodiment of this disclosure.

In S801, the management apparatus stores importance level information indicating a plurality of alert conditions and, for each of the alert conditions, a corresponding importance level of the alert condition. In S802, the management apparatus monitors a multi-function device through the network. In S803, the management apparatus detects an occurrence of an alert condition at the multi-function device at a first time. Note that S801 may occur after S802 or S803, but before S804.

In S804, the management apparatus determines, based on the importance level of the detected alert condition, whether a notification deferment condition is present. For example, if the importance level of the detected alert condition is at or above a predetermined importance level threshold value, then the management apparatus may determine that the notification deferment condition is not present. On the other hand, if the importance level of the detected alert condition is below a predetermined importance level threshold value, then the management apparatus may determine that the notification deferment condition is present. The importance level of the detected alert condition may itself be ascertained from the importance level information stored in S801.

If it is determined in S804 that the notification deferment condition is not present (S804, No), then in S805 a trigger signal is outputted, and in S806 the notification operation is performed in response to the output of the trigger signal. On the other hand, if it is determined in S804 that the notification deferment condition is present (S804, Yes), then in S807 the management apparatus defers outputting the trigger signal for the duration of the specific notification deferment period.

According to another exemplary embodiment of this disclosure, the management apparatus determines the duration of the notification deferment period, based on a type of the detected alert condition.

According to this exemplary embodiment, the management apparatus 17 stores deferment period information indicating a plurality of alert conditions and, for each of the alert conditions, a corresponding notification deferment period. The deferment period information may be maintained by, for example, the control part 17b and/or may be stored in a storage part of the management apparatus 17. For example, FIG. 2 shows an exemplary constitution of a management apparatus 200 as a computer, and the deferment period information may be stored in storage part 22 of the management apparatus 200.

An example of deferment period information is depicted in FIG. 9. The deferment period information may list a plurality of alert conditions that may occur at the multi-function device 15. In the example of FIG. 9, the alert conditions include paper jam, out of paper, out of ink, no network connection, and maximum storage capacity reached. The deferment period information also lists, for each of the alert conditions, a corresponding notification deferment period. For example, it can be seen in the deferment period information of FIG. 9 that the notification deferment period corresponding to the alert condition 'Paper Jam' is 2 hours, the notification deferment period corresponding to the alert condition 'No Network Connection' is 10 minutes, and so forth.

The information depicted in FIG. 9 is merely exemplary, and other alert conditions and/or notification deferment periods may be included in the deferment period information. Further, the management apparatus 17 may allow an administrator to change the deferment period information as desired. For example, the management apparatus 17 may include a user interface configured to allow an administrator to change the notification deferment periods corresponding to each alert condition, as illustrated in FIG. 6B.

According to this exemplary embodiment, if the control part 17b determines, based on the type and/or importance level of a detected alert condition, that the notification deferment condition is present, then control part 17b defers triggering the notification operation for the notification deferment period corresponding to the detected alert condition.

Using the example of the deferment period information depicted in FIG. 9, if the initially detected alert condition is an 'Out of Paper' alert condition (and the control part determines that the notification deferment condition is present), then the control part 17b defers triggering the notification operation for the notification deferment period of 1 hour corresponding to the detected alert condition 'Out of Paper'. On the other hand, if the initially detected alert condition is the 'No Network Connection' alert condition (and the control part determines that the notification deferment condition is present), then the control part 17b defers triggering the notification operation for the notification deferment period of 10 minutes corresponding to the detected alert condition 'No Network Connection'.

Thus, according to this exemplary embodiment, the management apparatus determines the duration of the notification deferment period, based on the type of the detected alert condition. Accordingly, if the management apparatus determines that it is appropriate to defer triggering the notification operation, the management apparatus will defer triggering the notification operation for the notification deferment period corresponding to the detected alert condition. In this way, the management apparatus 'ignores' the occurrence of the alert condition for a certain period of time, and waits for the alert condition to be corrected at the multi-function device. The waiting time is changed based on, for example, the criticality of the alert condition and/or difficulty in recovering from the alert condition. For example, for more minor alert conditions, the management apparatus may wait a shorter amount of time, when compared to more serious alert conditions.

Figure 10A:
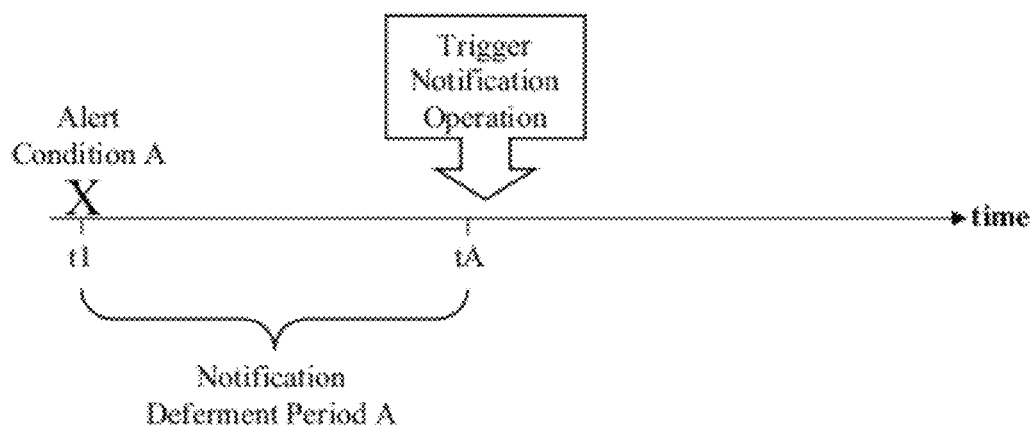
FIGS. 10A and 10B depict timing diagrams illustrating aspects of operations performed by a management apparatus, such as management apparatus 17 illustrated in FIG. 1A, according to another exemplary embodiment of this disclosure.
Figure 10B:
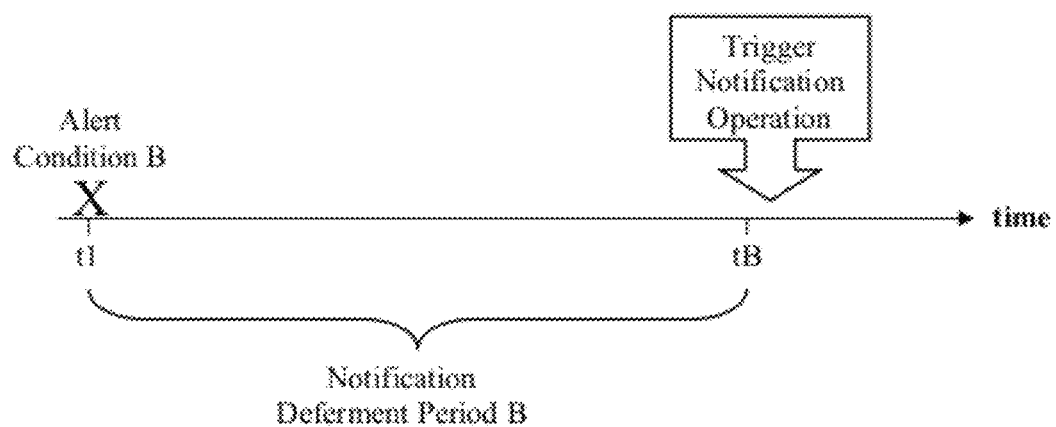

FIGS. 10A and 10B depict timing diagrams illustrating certain aforementioned aspects of operations performed by a management apparatus, such as management apparatus 17 illustrated in FIG. 1A, according to this exemplary embodiment of this disclosure.

As seen in FIG. 10A, the alert condition A is detected at the multi-function device at the first time "t1". If the control part 17b of the management apparatus 17 determines that the notification deferment condition is present, then the control part will defer triggering the notification operation for a notification deferment period A corresponding to the detected alert condition A. Once the notification deferment period A has expired at a time "tA", the control part may trigger the notification operation as necessary (e.g. if the alert condition is still present at the multi-function device).

On the other hand, with reference to FIG. 10B, the alert condition B is also detected at the multi-function device at the first time "t1". If the control part 17b of the management apparatus 17 determines that the notification deferment condition is present, then the control part will defer triggering the notification operation for a notification deferment period B corresponding to the detected alert condition B, which may be different from the notification deferment period A corresponding to the detected alert condition A, as seen in FIG. 10A. Once the notification deferment period B has expired at a time "tB", the control part may trigger the notification operation as necessary (e.g. if the alert condition is still present at the multi-function device).

Figure 11:
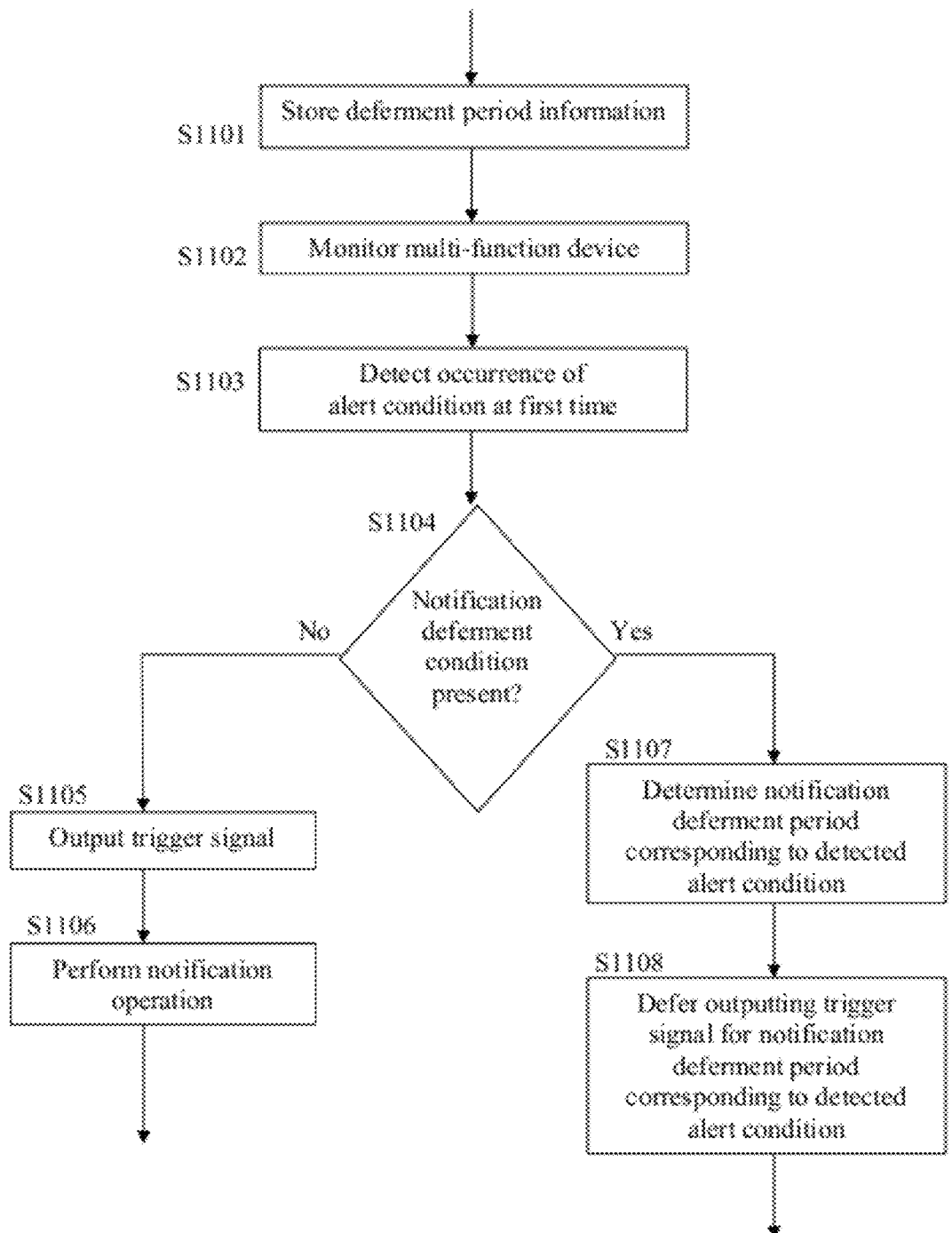
FIG. 11 shows a flowchart of a method performed by a management apparatus, such as management apparatus 17 illustrated in FIG. 1A, according to another exemplary embodiment of this disclosure.

Turning now to FIG. 11, there is shown a flowchart of a method performed by a management apparatus, such as management apparatus 17 illustrated in FIG. 1A, according to this exemplary embodiment of this disclosure.

In S1101, the management apparatus stores deferment period information indicating a plurality of alert conditions and, for each of the alert conditions, a corresponding notification deferment period. In S1102, the management apparatus monitors a multi-function device through the network. In S1103, the management apparatus detects an occurrence of an alert condition at the multi-function device at a first time. Note that S1101 may occur after S1102 or S1103.

In S1104, the management apparatus determines, based on the type and/or importance level of the detected alert condition, whether a notification deferment condition is present. If it is determined in S1104 that the notification deferment condition is not present (S1104, No), then in S1105 a trigger signal is outputted, and in S1106 the notification operation is performed in response to the output of the trigger signal.

On the other hand, if it is determined in S1104 that the notification deferment condition is present (S1104, Yes), then in S1107 the management apparatus determines a notification deferment period corresponding to detected alert condition (e.g. based on a type of the detected alert condition). This determination may be made based on the deferment period information stored in S1101. Finally, in S1108 the management apparatus defers outputting the trigger signal for the duration of the notification deferment period corresponding to detected alert condition, as determined in S1107.

According to another exemplary embodiment of this disclosure, the control part 17b of the management apparatus 17 triggers the notification operation, only if the detected alert condition is sustained at the multi-function device throughout the notification deferment period.

That is, if the control part 17b has determined that the notification deferment condition is present and has deferred triggering the notification operation for a specific notification deferment period, then after this notification deferment period has expired, the control part 17b determines whether the detected alert condition (detected at the first time t1) has been sustained throughout the notification deferment period. If the control part 17b determines that the detected alert condition has been sustained through the notification deferment period, then the control part 17b causes the notification generation part 17c to perform the notification operation (e.g. by outputting the trigger signal to the notification generation part 17c). On the other hand, if the control part 17b determines that the detected alert condition has not been sustained through the notification deferment period, then the control part 17b does not cause the notification generation part 17c to perform the notification operation (e.g. the trigger signal is not output to the notification generation part 17c).

Thus, according to this exemplary embodiment, the system only reports alert conditions to an IT administrator, if the underlying alert condition has been sustained for a predetermined period of time. Such a situation may indicate that a serious issue or problem exists at the multi-function device, or that users of the multi-function device have been unable to correct a problem at the device for a significant period of time. Thus, the administrator is only apprised of the most relevant and important alert conditions.

Figure 12A:
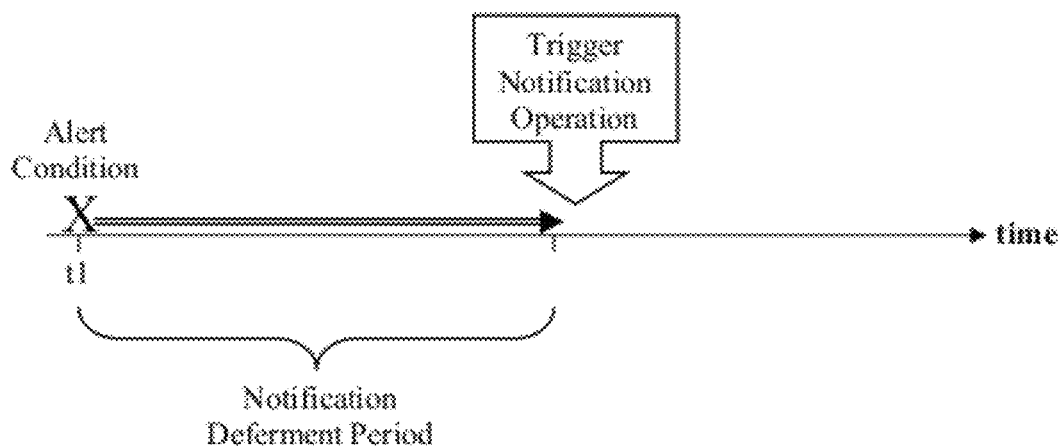
FIGS. 12A and 12B depict timing diagrams illustrating aspects of operations performed by a management apparatus, such as management apparatus 17 illustrated in FIG. 1A, according to another exemplary embodiment of this disclosure.
Figure 12B:
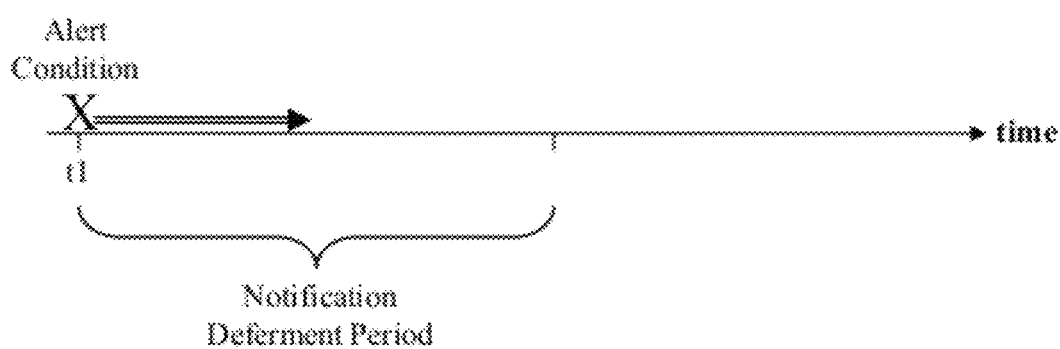

FIGS. 12A and 12B depict timing diagrams illustrating certain aforementioned aspects of operations performed by a management apparatus, such as management apparatus 17 illustrated in FIG. 1A, according to this exemplary embodiment of this disclosure.

The alert condition "X" is detected at the multi-function device at the first time "t1". If the control part 17b of the management apparatus 17 determines that the notification deferment condition is present, then the control part will defer triggering the notification operation for a notification deferment period. As seen in FIG. 12A, once the notification deferment period has expired, if the control part determines that the detected alert condition has been sustained through the notification deferment period, then the control part triggers the notification operation. On the other hand, with reference to FIG. 12B, once the notification deferment period has expired, if the control part determines that the detected alert condition has not been sustained through the notification deferment period, then the control part does not trigger the notification operation.

Figure 13:
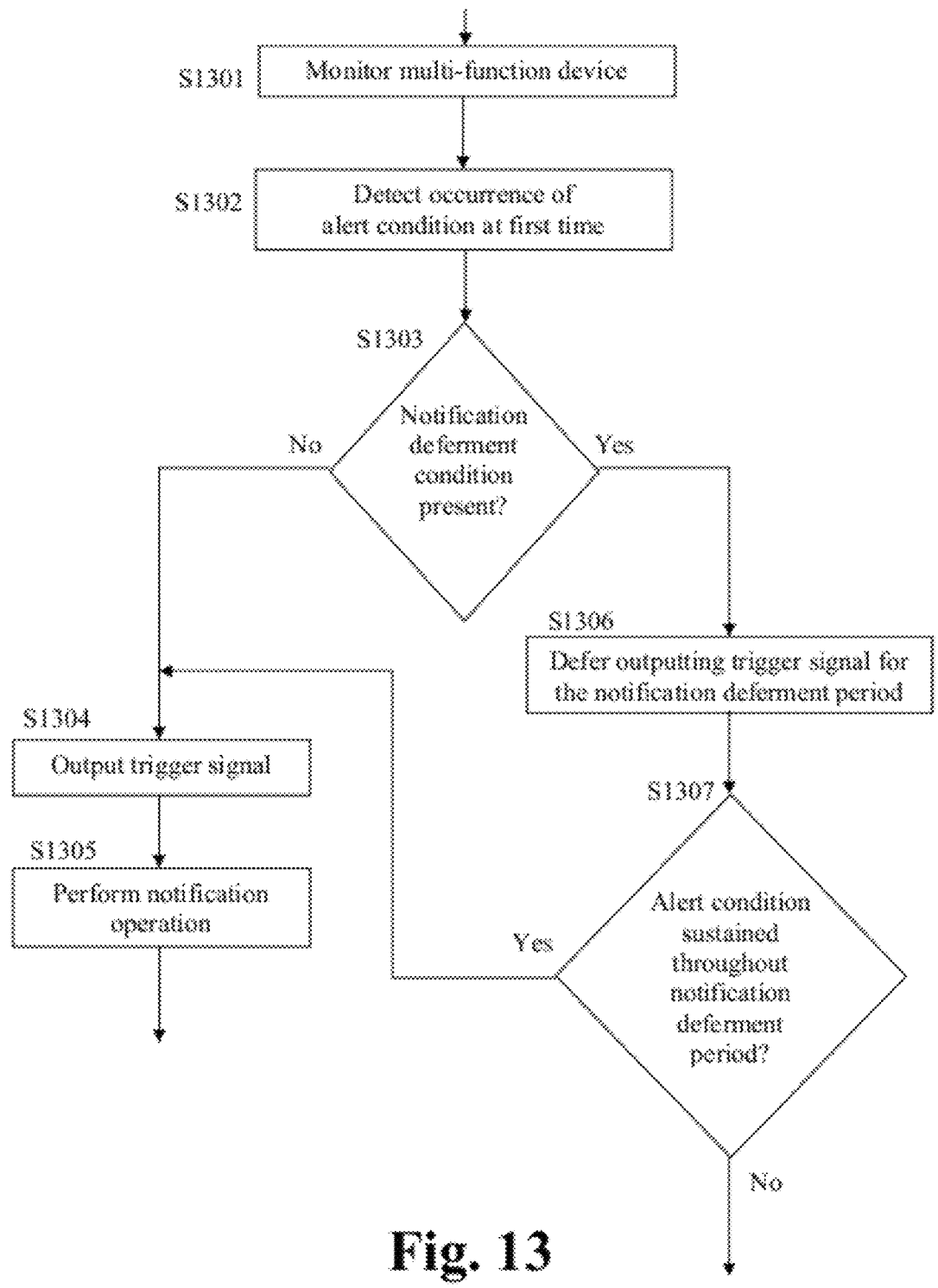
FIG. 13 shows a flowchart of a method performed by a management apparatus, such as management apparatus 17 illustrated in FIG. 1A, according to another exemplary embodiment of this disclosure.

Turning now to FIG. 13, there is shown a flowchart of a method performed by a management apparatus, such as management apparatus 17 illustrated in FIG. 1A, according to this exemplary embodiment of this disclosure.

In S1301, the management apparatus monitors a multi-function device through the network. In S1302, the management apparatus detects an occurrence of an alert condition at the multi-function device at a first time. In S1303, the management apparatus determines, based on the type and/or importance level of the detected alert condition, whether a notification deferment condition is present. If it is determined in S1303 that the notification deferment condition is not present (S1303, No), then in S1304 a trigger signal is outputted, and in S1305 the notification operation is performed in response to the output of the trigger signal.

On the other hand, if it is determined in S1303 that the notification deferment condition is present (S1303, Yes), then in S1306 the management apparatus defers outputting the trigger signal for the duration of the notification deferment period. Then in S1307, the management apparatus determines whether the detected alert condition was sustained at the multi-function device throughout the notification deferment period. If it is determined the detected alert condition was sustained throughout the notification deferment period (S1307, Yes), then the flow proceeds to S1304. If it is determined the detected alert condition was not sustained throughout the notification deferment period (S1307, No), then the flow ends.

According to another exemplary embodiment of this disclosure, the control part 17b of the management apparatus 17 triggers the notification operation, only if the alert condition has occurred at least a first number of times during the notification deferment period.

That is, if the control part 17b has determined that the notification deferment condition is present and has deferred triggering the notification operation for a specific notification deferment period, then after this notification deferment period has expired, the control part 17b determines whether the detected alert condition (detected at the first time t1) has occurred repeatedly at least a first number of times during the notification deferment period. If the control part 17b determines that the detected alert condition has occurred at least a first number of times during the notification deferment period, then the control part 17b causes the notification generation part 17c to perform the notification operation (e.g. by outputting the trigger signal to the notification generation part 17c). On the other hand, if the control part 17b determines that the detected alert condition has not occurred at least a first number of times during the notification deferment period, then the control part 17b does not cause the notification generation part 17c to perform the notification operation (e.g. the trigger signal is not output to the notification generation part 17c).

Thus, according to this exemplary embodiment, the system only reports alert conditions to an IT administrator, if the underlying alert condition has been repeated a specified number of times during a predetermined period of time. Such a situation may indicate that a serious issues or problems exist at the multi-function device, or that users of the multi-function device have been unable to correct problems at the device for a significant period of time. Thus, the administrator is only apprised of the most relevant and important alert conditions.

Figure 14A:
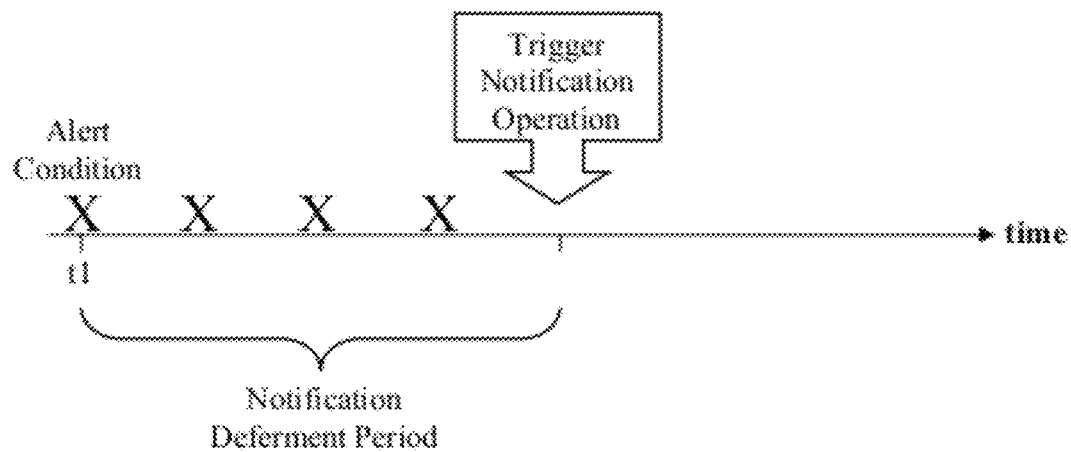
FIGS. 14A and 14B depict timing diagrams illustrating aspects of operations performed by a management apparatus, such as management apparatus 17 illustrated in FIG. 1A, according to another exemplary embodiment of this disclosure.
Figure 14B:
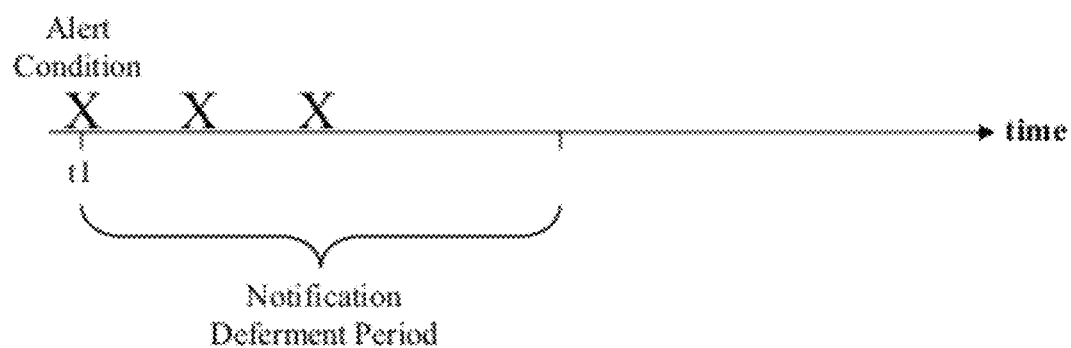

FIGS. 14A and 14B depict timing diagrams illustrating certain aforementioned aspects of operations performed by a management apparatus, such as management apparatus 17 illustrated in FIG. 1A, according to this exemplary embodiment of this disclosure.

The alert condition "X" is first detected at the multi-function device at the first time "t1". If the control part 17b of the management apparatus 17 determines that the notification deferment condition is present, then the control part will defer triggering the notification operation for a notification deferment period. As seen in FIG. 14A, once the notification deferment period has expired, if the control part determines that the detected alert condition has occurred at least a given number of times (e.g. four times) during the notification deferment period, then the control part triggers the notification operation. On the other hand, with reference to FIG. 14B, once the notification deferment period has expired, if the control part determines that the detected alert condition has not occurred at least a given number of times (i.e. four times) during the notification deferment period, then the control part does not trigger the notification operation.

Figure 15:
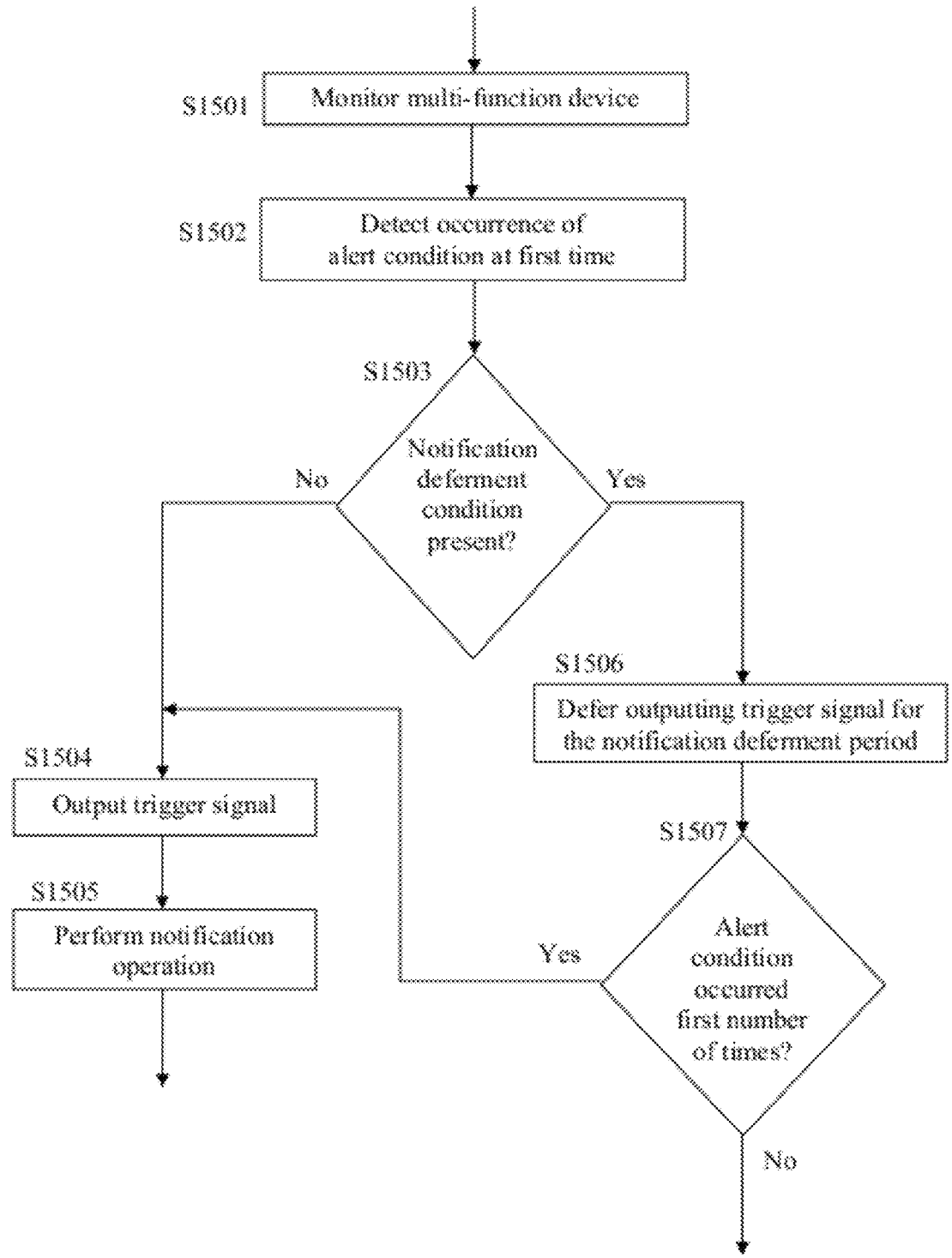
FIG. 15 shows a flowchart of a method performed by a management apparatus, such as management apparatus 17 illustrated in FIG. 1A, according to another exemplary embodiment of this disclosure.

Turning now to FIG. 15, there is shown a flowchart of a method performed by a management apparatus, such as management apparatus 17 illustrated in FIG. 1A, according to this exemplary embodiment of this disclosure.

In S1501, the management apparatus monitors a multi-function device through the network. In S1502, the management apparatus detects an occurrence of an alert condition at the multi-function device at a first time. In S1503, the management apparatus determines, based on the type and/or importance level of the detected alert condition, whether a notification deferment condition is present. If it is determined in S1503 that the notification deferment condition is not present (S1503, No), then in S1504 a trigger signal is outputted, and in S1505 the notification operation is performed in response to the output of the trigger signal.

On the other hand, if it is determined in S1503 that the notification deferment condition is present (S1503, Yes), then in S1506 the management apparatus defers outputting the trigger signal for the duration of the notification deferment period. Then in S1507, the management apparatus determines whether the detected alert condition occurred at least a first number of times during the notification deferment period. If it is determined the detected alert condition occurred at least a first number of times during the notification deferment period (S1507, Yes), then the flow proceeds to S1504. If it is determined the detected alert condition did not occur at least a first number of times during the notification deferment period (S1507, No), then the flow ends.

According to this exemplary embodiment of this disclosure, if the control part 17b has determined that the notification deferment condition is present (and has begun deferring the notification operation for a specific notification deferment period), the control part 17b waits until the end of the notification deferment period before determining if the alert condition has a occurred at least a first number of times during the notification deferment period.

Alternatively, the control part 17b may trigger the notification operation during the notification deferment period, as soon as the alert condition repeatedly occurs at least a first number of times during the notification deferment period. For example, suppose the notification deferment period is 1 hour, the specified first number of times is 4, and the alert condition occurs 4 times after only 40 minutes, as measured from the beginning of the notification deferment period and/or the first time t1 when the alert condition first occurred. As soon as the alert condition has occurred 4 times (i.e. approx 40 minutes after the first occurrence of the alert condition that was detected at the first time t1), then the control part immediately triggers the notification operation during the notification deferment period, even though the full notification deferment period of 1 hour has not yet fully transpired.

Figure 16A:
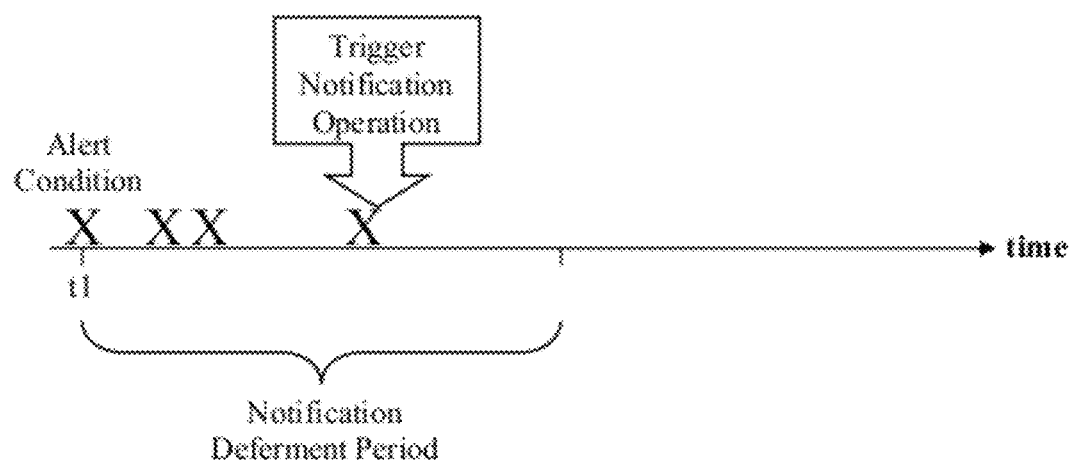
FIGS. 16A and 16B depict timing diagrams illustrating aspects of operations performed by a management apparatus, such as management apparatus 17 illustrated in FIG. 1A, according to another exemplary embodiment of this disclosure.
Figure 16B:
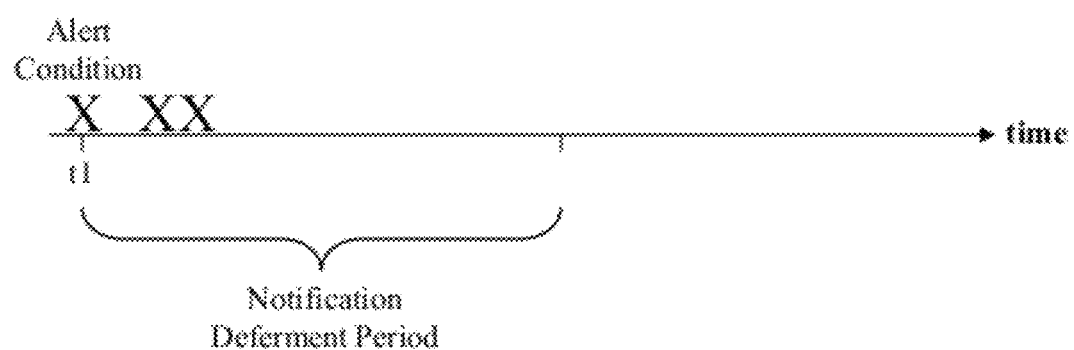

FIGS. 16A and 16B depict timing diagrams illustrating certain aforementioned aspects of operations performed by a management apparatus, such as management apparatus 17 illustrated in FIG. 1A, according to this exemplary embodiment of this disclosure.

The alert condition "X" is first detected at the multi-function device at the first time "t1". If the control part 17b of the management apparatus 17 determines that the notification deferment condition is present, then the control part will defer triggering the notification operation for a notification deferment period. As seen in FIG. 16A, if during the notification deferment period the control part determines that the detected alert condition has occurred at least a given number of times (e.g. four times), then the control part triggers the notification operation as soon as this determination is made. On the other hand, with reference to FIG. 16B, if during the notification deferment period the control part determines that the detected alert condition has not occurred at least a given number of times (i.e. four times), then the control part does not trigger the notification operation.

Figure 17:
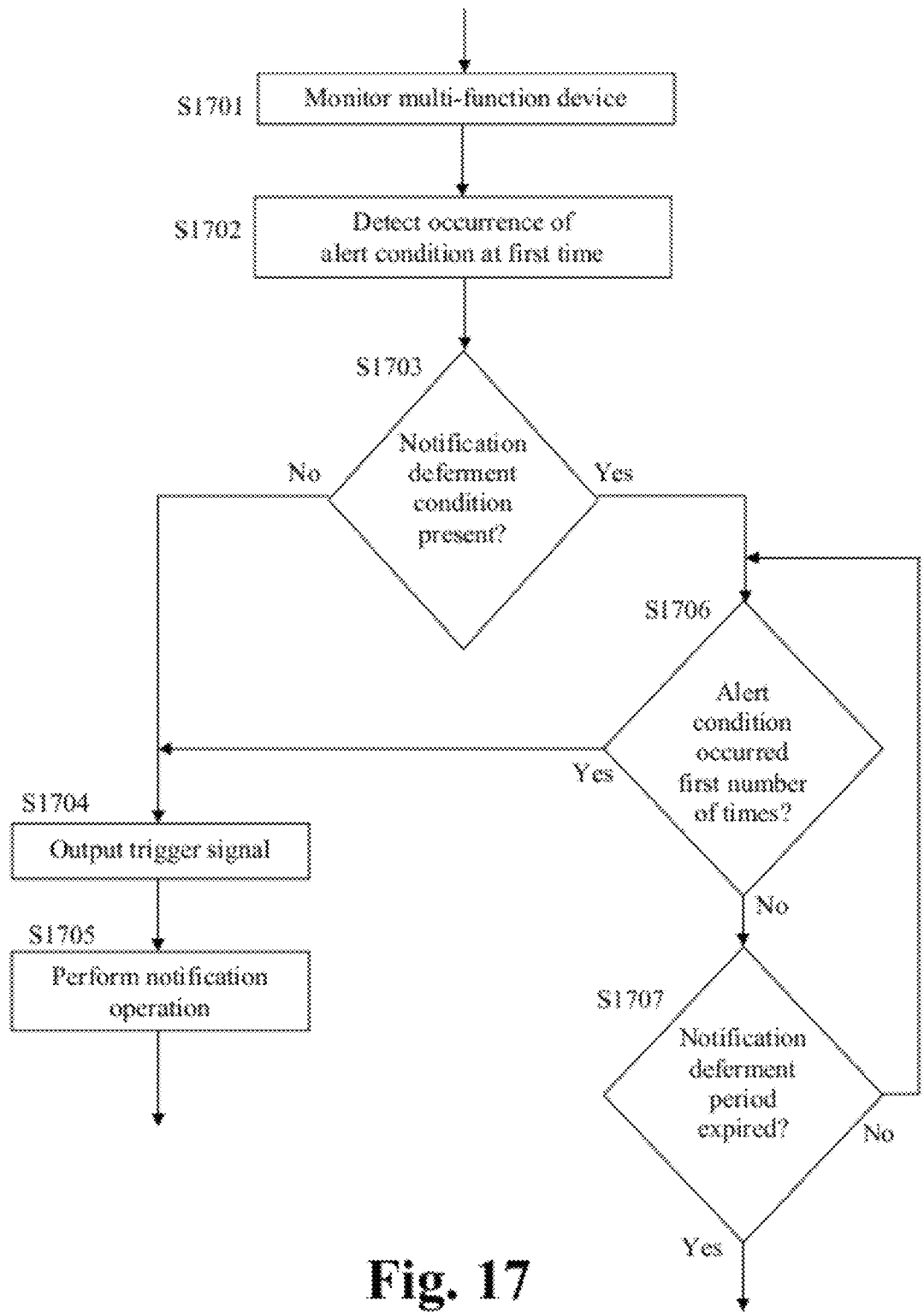
FIG. 17 shows a flowchart of a method performed by a management apparatus, such as management apparatus 17 illustrated in FIG. 1A, according to another exemplary embodiment of this disclosure.

Turning now to FIG. 17, there is shown a flowchart of a method performed by a management apparatus, such as management apparatus 17 illustrated in FIG. 1A, according to this exemplary embodiment of this disclosure.

In S1701, the management apparatus monitors a multi-function device through the network. In S1702, the management apparatus detects an occurrence of an alert condition at the multi-function device at a first time. In S1703, the management apparatus determines, based on the type and/or importance level of the detected alert condition, whether a notification deferment condition is present. If it is determined in S1703 that the notification deferment condition is not present (S1703, No), then in S1704 a trigger signal is outputted, and in S1705 the notification operation is performed in response to the output of the trigger signal.

On the other hand, if it is determined in S1703 that the notification deferment condition is present (S1703, Yes), then in S1706 the management apparatus determines whether the detected alert condition has occurred at least a first number of times during the notification deferment period. If it is determined the detected alert condition occurred at least a first number of times (S1706, Yes), then the flow proceeds to S1704. If it is determined the detected alert condition has not occurred at least a first number of times during the notification deferment period (S1706, No), then it is determined if the notification deferment period has expired in S1707. If the notification deferment period has not expired (S1707, No), then the flow returns to S1706, whereas if the notification deferment period has expired (S1707, Yes) then the process flow ends.

According to another exemplary embodiment of this disclosure, the control part 17b of the management apparatus 17 triggers the notification operation, only if the next occurrence of the alert condition is after the expiration of the notification deferment period.

That is, if the control part 17b has determined that the notification deferment condition is present, and has deferred triggering the notification operation for a specific notification deferment period, then after this notification deferment period has expired, the control part 17b determines whether the next occurrence alert condition (after the first occurrence of the alert condition at the first time t1) was before or after the expiration of the notification deferment period. If the control part 17b determines that the next occurrence of the alert condition was before the expiration of the notification deferment period (i.e. during the notification deferment period), then the control part 17b does not cause the notification generation part 17c to perform the notification operation (e.g. the trigger signal is not output to the notification generation part 17c). On the other hand, if the control part 17b determines that the next occurrence of the alert condition is only after the expiration of the notification deferment period, then the control part 17b causes the notification generation part 17c to perform the notification operation (e.g. by outputting the trigger signal to the notification generation part 17c).

Thus, according to this exemplary embodiment, the system does not report an alert condition to an IT administrator within a predetermined time period of the previous occurrence of the same alert condition at the multi-function device. Thus, a administrator is not confronted with a high number of alert notifications.

Figure 18A:
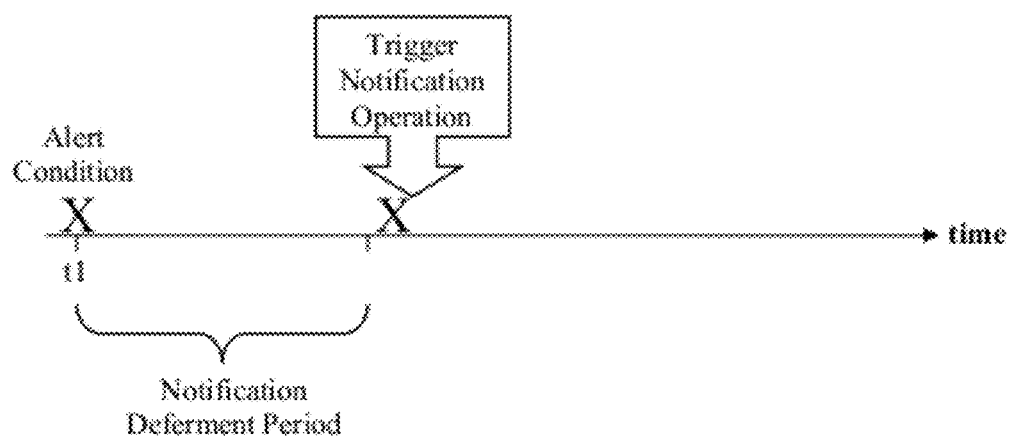
FIGS. 18A and 18B depict timing diagrams illustrating aspects of operations performed by a management apparatus, such as management apparatus 17 illustrated in FIG. 1A, according to another exemplary embodiment of this disclosure.
Figure 18B:
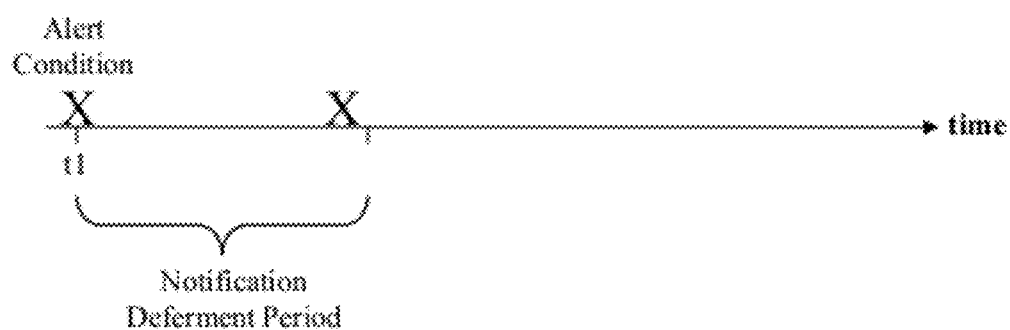

FIGS. 18A and 18B depict timing diagrams illustrating certain aforementioned aspects of operations performed by a management apparatus, such as management apparatus 17 illustrated in FIG. 1A, according to this exemplary embodiment of this disclosure.

The alert condition "X" is first detected at the multi-function device at the first time "t1". If the control part 17b of the management apparatus 17 determines that the notification deferment condition is present, then the control part will defer triggering the notification operation for a notification deferment period. As seen in FIG. 18A, after the notification deferment period has expired, if the control part determines that the next occurrence of the alert condition (after the first occurrence at time t1) was only after the expiration of the notification deferment period, then the control part triggers the notification operation. On the other hand, with reference to FIG. 18B, after the notification deferment period has expired, if the control part determines that the next occurrence of the alert condition (after the first occurrence at time t1) was before the expiration of the notification deferment period, then the control part does not trigger the notification operation.

Note that, alternatively, the above-described aspects of this exemplary embodiment can be applied even if a notification operation is triggered at a time t1 when the alert condition is first detected at time t1. That is, if the notification operation is triggered at time t1, then the management apparatus may ignore a similar alert condition for the duration of a notification deferment period, and only trigger a notification operation if the next occurrence of the alert condition is after the expiration of the notification deferment period. Thus, an alert notification is not generated within a certain time of a previously generated alert notification.

Figure 19:
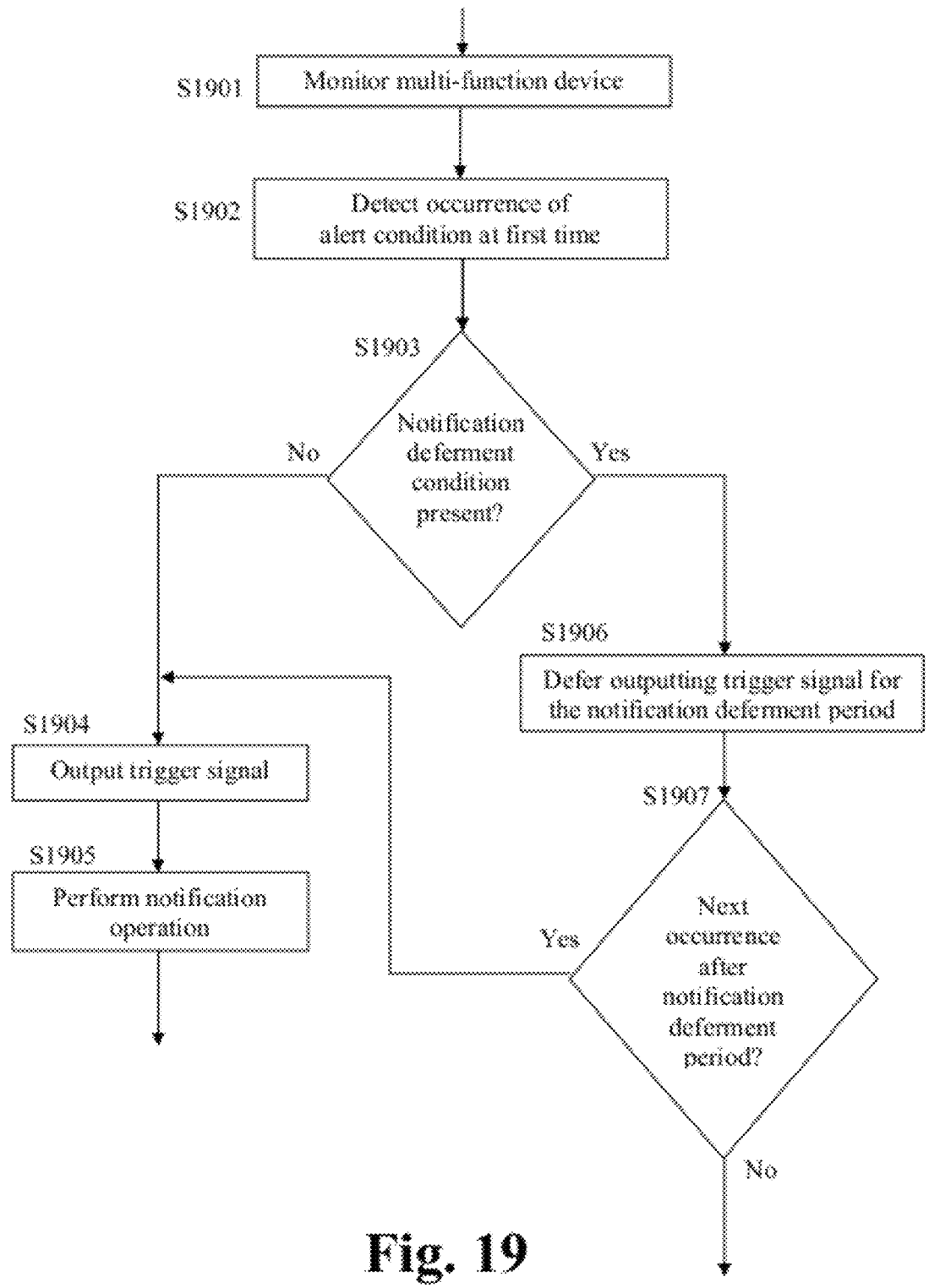
FIG. 19 shows a flowchart of a method performed by a management apparatus, such as management apparatus 17 illustrated in FIG. 1A, according to another exemplary embodiment of this disclosure.

Turning now to FIG. 19, there is shown a flowchart of a method performed by a management apparatus, such as management apparatus 17 illustrated in FIG. 1A, according to this exemplary embodiment of this disclosure.

In S1901, the management apparatus monitors a multi-function device through the network. In S1902, the management apparatus detects an occurrence of an alert condition at the multi-function device at a first time. In S1903, the management apparatus determines, based on the type and/or importance level of the detected alert condition, whether a notification deferment condition is present. If it is determined in S1903 that the notification deferment condition is not present (S1903, No), then in S1904 a trigger signal is outputted, and in S1905 the notification operation is performed in response to the output of the trigger signal.

On the other hand, if it is determined in S1903 that the notification deferment condition is present (S1903, Yes), then in S1906 the management apparatus defers outputting the trigger signal for the duration of the notification deferment period. Then in S1907, the management apparatus determines whether the next occurrence of the alert condition (after the first occurrence at time t1) is after the expiration of the notification deferment period. If it is determined that the next occurrence of the alert condition is only after the expiration of the notification deferment period (S1907, Yes), then the flow proceeds to S1904. On the other hand, if it is determined that the next occurrence of the alert condition was before the expiration of the notification deferment period (i.e. during the notification deferment period) (S1907, No), then the process flow ends.

While the examples shown in this disclosure include one management apparatus and one multi-function device, it should be appreciated that such numbers of devices, terminals and apparatuses are arbitrary and are selected as an example in order to facilitate discussion, and that the subject matter of this disclosure can be implemented in a system including one or more systems, servers, apparatuses and terminals. Other devices, such as scanners, printers and multi-function devices may also be connected to a network, as is well known in the art. Further, the management apparatus and a multi-function device may be connected in a different network arrangement to that depicted in FIG. 1.

In the exemplary embodiment illustrated in FIG. 1A, the management apparatus is depicted as directly including or physically incorporating the monitoring part 17a, control part 17b and notification generation part 17c. However, one or more of the aforementioned parts of the management apparatus may be located externally from the management apparatus, wherein the management apparatus accesses remotely the functionalities of these external parts.

Figure 20:
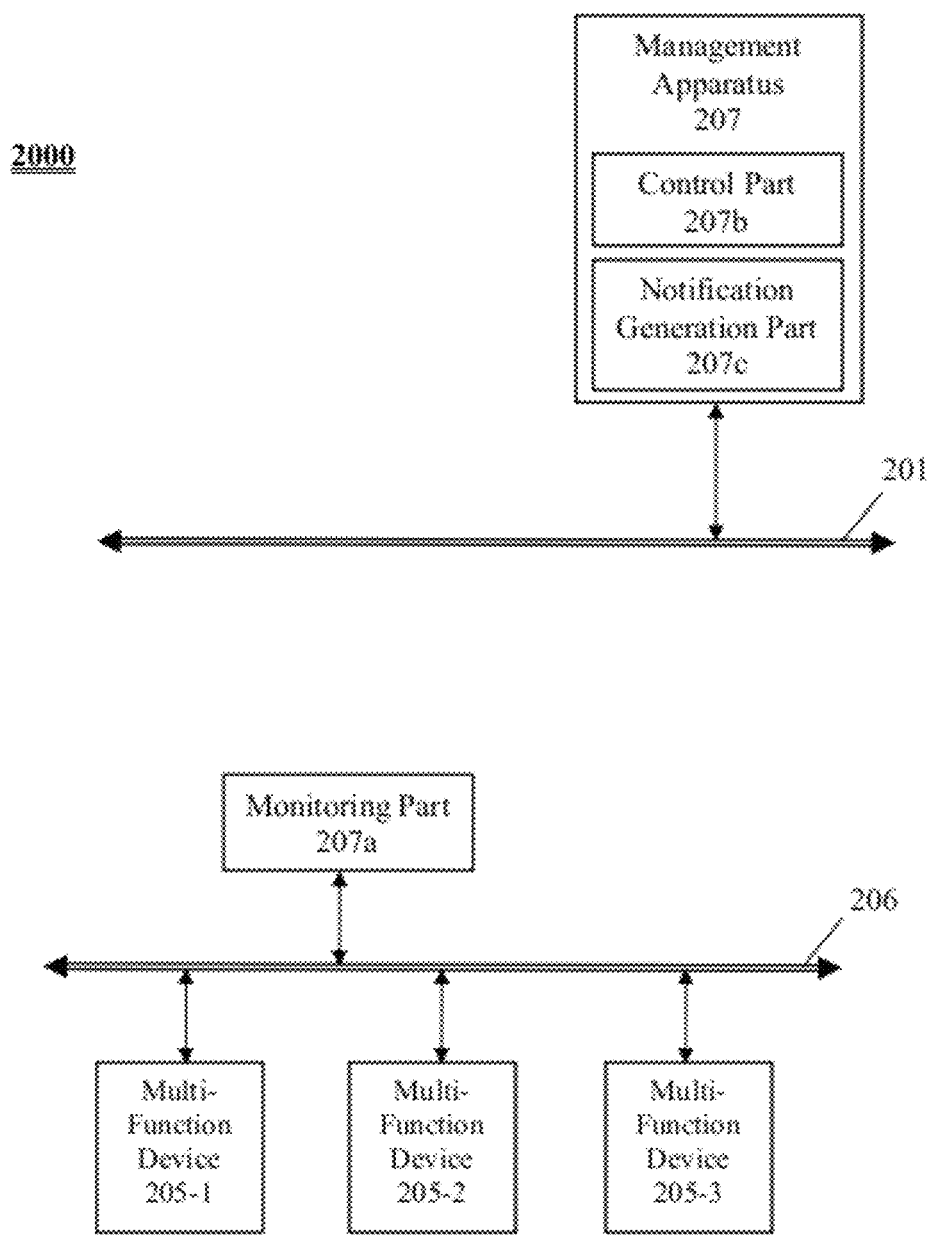
FIG. 20 shows a block diagram of a system, according to another exemplary embodiment of this disclosure.

For example, FIG. 20 illustrates an example of a system 2000 including a management apparatus 207 connected to network 201. The management apparatus 207 may be similar to management apparatus 17 illustrated in FIG. 1A, except that the monitoring part 207a of management apparatus 207 is remote from the management apparatus 207 and connected to a network 206. The monitoring part 207a may detect an occurrence of an alert condition at any one of multi-function devices 205-1 through 205-3 connected to network 206. Further, the monitoring part 207a may communicate remotely with the control part 207b of the management apparatus 207, wherein the content of the communications may indicate the status of the multi-function devices 205-1 through 205-3 and whether an alert condition has occurred at the multi-function device. The management apparatus 207 may then generate alert notifications according to the exemplary embodiments of this disclosure, as described above.

Although the multi-function device 15 depicted in FIG. 1A is shown as being connected to the network 11, the aspects of this disclosure may be applied to a system for managing a device that is not connected to a network. For example, aspects of this disclosure may be applied to a system for managing a device with use of radio-frequency identification (RFID) technology.

Figure 21:
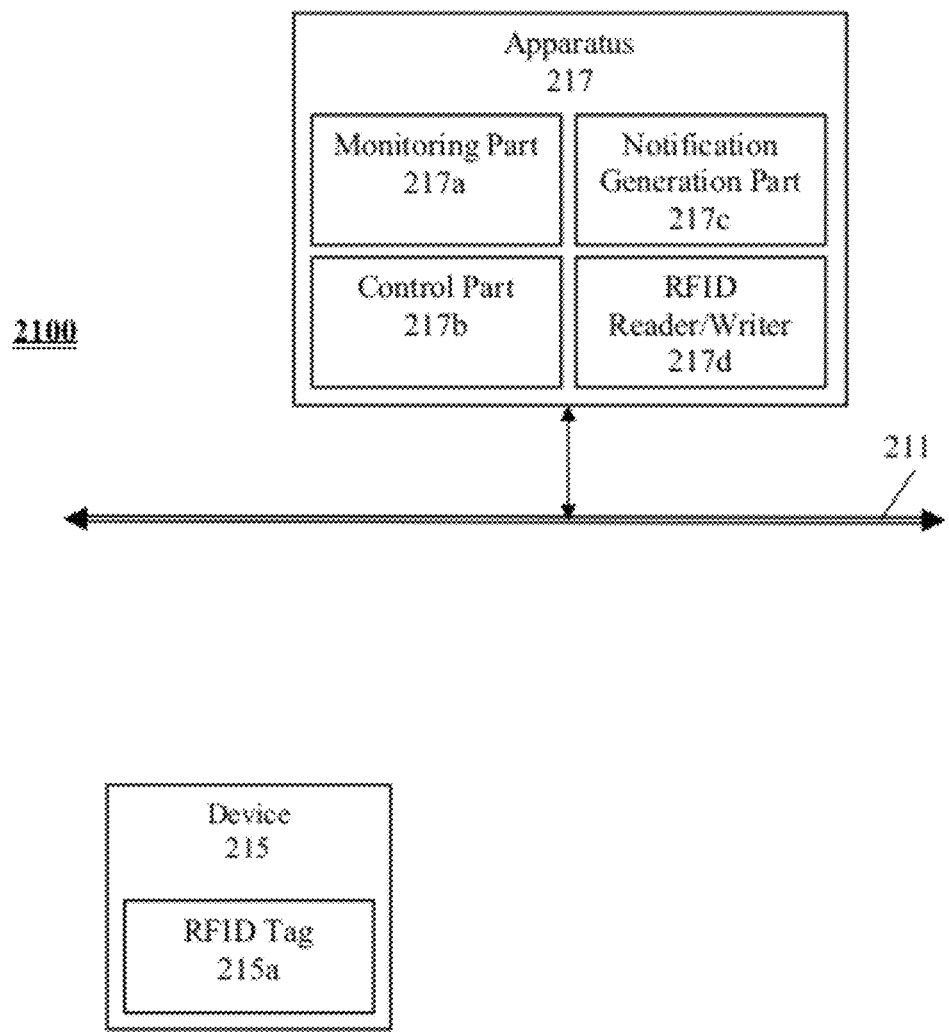
FIG. 21 shows a block diagram of a system, according to another exemplary embodiment of this disclosure.

FIG. 21 depicts an example of a system 2100 according to another exemplary embodiment of this disclosure. The system 2100 includes management apparatus 217, which may be similar to the management apparatus 17 depicted in FIG. 1A, except that the management apparatus 217 also includes an RFID Reader/Writer 217d. The system 2100 further includes a device 215 which is an IT asset that is not network-connected, (i.e. a standalone device with no network interface), such as an electronic stapler, shredder, etc. The device 215 may include an RFID tag 215a physically incorporated into the device 215, or in some way attached to the device 215. In this way, the RFID reader/writer 217d of the management apparatus 217 may communicate with the RFID tag 215a of the device 215, in order to determine (and inform the control part 217b) when an alert condition exists at the device 215 or when the device 215 requires maintenance. The management apparatus 217 may then generate alert notifications according to the exemplary embodiments of this disclosure, as described above. Aspects of RFID technology, including the ability for RFID reader/writer devices to communicate with RFID tags, are well understood in the art.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. An apparatus for managing a multi-function device through a network, said apparatus comprising:
a monitoring part configured to monitor the multi-function device through the network and detect an occurrence of an alert condition at the multi-function device at a first time;
a storage part configured to store importance level information for a plurality of types of alert conditions, wherein
the stored importance level information, for each alert condition type amongst the plurality of types of alert conditions, associates the alert condition type with an importance level amongst a plurality of importance levels and associates the importance level with a corresponding notification deferment time amount amongst a plurality of notification periods of time; and
a control part that determines, based on the stored important level information and a type of the detected alert condition, the importance level of the detected alert condition, and determines whether a notification deferment condition is present based on whether the importance level is at or above a predetermined importance level threshold, and
in a case that the notification deferment condition is not present, the control part outputs a trigger signal to trigger a notification operation, the notification operation including generating an alert notification and transmitting the generated alert notification through the network, and
in a case that the notification deferment condition is present, the control part determines based on the stored importance level information the notification deferment time amount associated with the importance level of the detected alert condition and defers triggering the notification operation for the notification deferment time amount indicated in the stored importance level information as being associated with the importance level of the detected alert condition, and beginning at the first time when the alert condition is detected; and
a notification generation part configured to perform the notification operation, when the notification generation part receives the trigger signal from the control part,
wherein after the notification deferment time amount has expired, the control part determines whether the same alert condition has occurred at least a predetermined number of times within the notification deferment time amount, and in a case that the control part determines that the same alert condition has occurred at least the predetermined number of times within the notification deferment time amount, the control part causes the notification generation part to perform the notification operation.

2. The apparatus of claim 1, wherein the notification deferment condition is whether the alert condition is not a critical type, and in a case that the alert condition is a critical type, the control part triggers the notification operation, and in a case that the alert condition is not a critical type, the control part defers triggering the notification operation for the notification deferment period.

3. The apparatus of claim 1,
wherein when the alert condition is detected by the monitoring part, the control part only outputs the trigger signal if the importance level corresponding to the detected alert condition is at or above a predetermined importance level threshold.

4. The apparatus of claim 1, wherein the control part determines a duration of the notification deferment period, based on a type of the detected alert condition.

5. The apparatus of claim 1, wherein after the notification deferment period has expired, the control part causes the notification generation part to perform the notification operation, only if the control part determines that the alert condition has been sustained throughout the notification deferment period.

6. The apparatus of claim 1, wherein the control part triggers the notification operation during the notification deferment period, if the control part determines that the alert condition occurred at least a first number of times during the notification deferment period.

7. The apparatus of claim 1, wherein after the notification deferment period has expired, the control part triggers the notification operation, only if the control part determines that the next occurrence of the alert condition is after the expiration of the notification deferment period.

8. A method for managing a multi-function device through a network by an apparatus, said method comprising:
monitoring the multi-function device through the network and detecting an occurrence of an alert condition at the multi-function device at a first time;
storing and maintaining importance level information for a plurality of types of alert conditions, wherein
the stored importance level information, for each alert condition type amongst the plurality of types of alert conditions, associates the alert condition type with an importance level amongst a plurality of importance levels and associates the importance level with a corresponding notification deferment time amount amongst a plurality of notification periods of time;
determining, based on a type of the detected alert condition, the importance level of the detected alert condition, and determining whether a notification deferment condition is present based on whether the importance level is at or above a predetermined importance level threshold, and
in a case that the notification deferment condition is not present, outputting a trigger signal to trigger a notification operation, the notification operation including generating an alert notification and transmitting the generated alert notification through the network, and
in a case that the notification deferment condition is present, determining based on the stored importance level information the notification deferment time amount associated with the importance level of the detected alert condition and deferring triggering the notification operation for the notification deferment time amount indicated in the stored importance level information as being associated with the importance level of the detected alert condition, and beginning at the first time when the alert condition is detected;

determining, in the case that the notification deferment condition is present, after the notification deferment time amount has expired, whether the same alert condition has occurred at least a predetermined number of times within the notification deferment time amount, and in a case that it is determined that the same alert condition has occurred at least the predetermined number of times within the notification deferment time amount, outputting the trigger signal to trigger the notification operation; and performing the notification operation, when the trigger signal is outputted.

9. The method of claim 8, wherein the notification deferment condition is whether the alert condition is not a critical type, and in a case that the alert condition is a critical type, the notification operation is triggered, and in a case that the alert condition is not a critical type, the notification operation is deferred for the notification deferment period.

10. The method of claim 8, further comprising determining a duration of the notification deferment period, based on a type of the detected alert condition.

11. The method of claim 8, further comprising:
storing deferment period information indicating a plurality of alert conditions and, for each of the alert conditions, a corresponding notification deferment period; and
deferring the notification operation, in the case that the notification deferment condition is present, for the notification deferment period corresponding to the detected alert condition.

12. The method of claim 8, further comprising causing the notification operation to be performed after the notification deferment period has expired, only if it is determined that the alert condition has been sustained throughout the notification deferment period.

13. The method of claim 8, further comprising causing the notification operation to be performed after the notification deferment period has expired, only if it is determined that the next occurrence of the alert condition is after the expiration of the notification deferment period.

14. A system including:
a multi-function device; and
an apparatus for managing the multi-function device through a network, said apparatus comprising:
a monitoring part configured to monitor the multi-function device through the network and detect an occurrence of an alert condition at the multi-function device at a first time;
a storage part configured to store importance level information for a plurality of types of alert conditions, wherein
the stored importance level information, for each alert condition type amongst the plurality of types of alert conditions, associates the alert condition type with an importance level amongst a plurality of importance levels and associates the importance level with a corresponding notification deferment time amount amongst a plurality of notification periods of time; and
a control part that determines, based on the stored important level information and a type of the detected alert condition, the importance level of the detected alert condition, and determines whether a notification deferment condition is present based on whether the importance level is at or above a predetermined importance level threshold, and
in a case that the notification deferment condition is not present, the control part outputs a trigger signal to trigger a notification operation, the notification operation including generating an alert notification and transmitting the generated alert notification through the network, and
in a case that the notification deferment condition is present, the control part determines based on the stored importance level information the notification deferment time amount associated with the importance level of the detected alert condition and defers triggering the notification operation for the notification deferment time amount indicated in the stored importance level information as being associated with the importance level of the detected alert condition, and beginning at the first time when the alert condition is detected; and
a notification generation part configured to perform the notification operation, when the notification generation part receives the trigger signal from the control part,
wherein control part determines whether the alert condition is a critical type in which the multi-function device is suffering a serious problem that requires immediate attention, and in a case that the alert condition is a critical type, the control part triggers the notification operation, and in a case that the alert condition is not a critical type, the control part defers triggering the notification operation for the notification deferment time amount.

15. The system of claim 14, wherein the control part determines a duration of the notification deferment period, based on a type of the detected alert condition.

16. The system of claim 14, wherein after the notification deferment period has expired, the control part causes the notification generation part to perform the notification operation, only if the control part determines that the alert condition has been sustained throughout the notification deferment period.

* * * * *